United States Patent
Gyota et al.

(10) Patent No.: US 9,928,558 B2
(45) Date of Patent: Mar. 27, 2018

(54) CONTROL DEVICE AND REMOTE CONTROLLER

(71) Applicants: Tomoaki Gyota, Tokyo (JP); Takuya Mukai, Tokyo (JP); Masanori Nakata, Tokyo (JP)

(72) Inventors: Tomoaki Gyota, Tokyo (JP); Takuya Mukai, Tokyo (JP); Masanori Nakata, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 253 days.

(21) Appl. No.: 14/762,251

(22) PCT Filed: Feb. 21, 2013

(86) PCT No.: PCT/JP2013/054274
§ 371 (c)(1),
(2) Date: Jul. 21, 2015

(87) PCT Pub. No.: WO2014/128876
PCT Pub. Date: Aug. 28, 2014

(65) Prior Publication Data
US 2015/0379658 A1    Dec. 31, 2015

(51) Int. Cl.
*G06T 1/00* (2006.01)
*G09G 5/22* (2006.01)
(Continued)

(52) U.S. Cl.
CPC ............ *G06T 1/00* (2013.01); *G06T 1/20* (2013.01); *G06T 1/60* (2013.01); *G06T 11/20* (2013.01);
(Continued)

(58) Field of Classification Search
CPC .................................... G06T 1/20; G09G 5/14
See application file for complete search history.

(56) References Cited

U.S. PATENT DOCUMENTS 4,747,074 A * 5/1988 Yoshida ............... G09G 5/363
345/440
4,974,196 A * 11/1990 Iwami ................. G06F 9/4443
708/682
(Continued)

FOREIGN PATENT DOCUMENTS

JP    2002-351452 A    12/2002
JP    2007-526161 A    9/2007
(Continued)

OTHER PUBLICATIONS

International Search Report of the International Searching Authority dated May 21, 2013 for the corresponding international application No. PCT/JP2013/054274 (and English translation).

*Primary Examiner* — Gregory J Tryder
*Assistant Examiner* — Jitesh Patel
(74) *Attorney, Agent, or Firm* — Posz Law Group, PLC

(57) ABSTRACT

The storage unit prestores element image data presenting an element image contained in a display image in an image data region that is a continuous storage region, and prestores draw command data containing data for creating display data presenting the display image in which the element image is placed in a draw command region that is a continuous storage region. The central processing unit makes reference to a screen management table when a predetermined drawing condition is satisfied to identify and output the draw command identification data corresponding to the satisfied drawing condition. The draw processing unit acquires from the storage unit the draw command data identified with the output draw command identification data, and creates and outputs to the display unit the display data placing the element image based on the acquired draw command data.

11 Claims, 26 Drawing Sheets

(51) Int. Cl.
   *G06T 1/20*    (2006.01)
   *G06T 1/60*    (2006.01)
   *G06T 11/20*   (2006.01)
   *G09G 5/42*    (2006.01)
   *H04L 12/28*   (2006.01)

(52) U.S. Cl.
   CPC ............... *G09G 5/222* (2013.01); *G09G 5/42* (2013.01); *H04L 12/282* (2013.01)

(56) References Cited

U.S. PATENT DOCUMENTS

| | | | | |
|---|---|---|---|---|
| 5,119,477 A * | 6/1992 | Ebbers | ............ | G06T 17/00 345/522 |
| 6,256,042 B1 * | 7/2001 | Iga | ............ | G06T 17/00 345/619 |
| 6,289,138 B1 * | 9/2001 | Yip | ............ | G06F 9/3879 382/307 |
| 6,353,449 B1 * | 3/2002 | Gregg | ............ | G09G 5/14 715/762 |
| 8,767,009 B1 * | 7/2014 | Guy | ............ | G09G 5/14 345/620 |
| 2003/0033455 A1 * | 2/2003 | Kotani | ............ | G06F 9/3877 710/22 |
| 2003/0095156 A1 * | 5/2003 | Klein | ............ | G06F 3/0481 715/864 |
| 2005/0010901 A1 * | 1/2005 | Udler | ............ | G06F 9/4443 717/109 |
| 2005/0162422 A1 * | 7/2005 | Miyata | ............ | G06F 3/041 345/440 |
| 2007/0132572 A1 | 6/2007 | Itoh et al. | | |
| 2007/0279389 A1 * | 12/2007 | Hoch | ............ | G06F 3/14 345/169 |
| 2010/0275155 A1 * | 10/2010 | Kawashima | ............ | G06F 9/4443 715/802 |
| 2011/0234607 A1 * | 9/2011 | Katsukura | ............ | G08C 17/00 345/522 |
| 2011/0249009 A1 * | 10/2011 | Nakata | ............ | G09G 5/026 345/501 |
| 2011/0264286 A1 * | 10/2011 | Park | ............ | G06Q 10/00 700/286 |

FOREIGN PATENT DOCUMENTS

| | | |
|---|---|---|
| JP | 2010-175638 A | 8/2010 |
| WO | 2005/080121 A1 | 9/2005 |

* cited by examiner

| SCREEN MANAGEMENT TABLE | | | | | | |
|---|---|---|---|---|---|---|
| SCREEN NUMBER | DRAW COMMAND ADDRESS | OPERATION TYPE | | | | |
| | | BUTTON 0 | BUTTON 1 | BUTTON 2 | ... | BUTTON N |
| 0 | AAAAA | 2 | 5 | 9 | | 4 |
| 1 | BBBBB | 6 | 3 | 10 | ... | 11 |
| 2 | CCCCC | 12 | 12 | 0 | | 7 |
| ⋮ | ⋮ | | ⋮ | | | |
| N | MMMMM | 3 | 8 | 7 | ... | 2 |

FIG.15

SCREEN MANAGEMENT TABLE 341

| SCREEN NUMBER | DRAW COMMAND ADDRESS | ELEMENT ADDRESS | | | | OPERATION TYPE | | | |
|---|---|---|---|---|---|---|---|---|---|
| | | | | | | BUTTON 0 | BUTTON 1 | BUTTON 2 | ... | BUTTON N |
| 0 | AAAAA | XXXX1 | ... | XXXXN | 2 | 5 | 9 | ... | 4 |
| 1 | BBBBB | YYYY1 | ... | YYYYN | 6 | 3 | 10 | ... | 11 |
| 2 | CCCCC | ZZZZ1 | ... | ZZZZN | 12 | 12 | 0 | ... | 7 |
| ... | ... | ... | | | | | | | |
| N | MMMMM | WWWW1 | ... | WWWWN | 3 | 8 | 7 | ... | 2 |

FIG.19

| INTERRUPT RESPONSE TABLE | | | | | | | | | | |
|---|---|---|---|---|---|---|---|---|---|---|
| DRAW COMMAND ADDRESS | DRAW INTERRUPT COUNT: 1 | | | DRAW INTERRUPT COUNT: M | | | ... | DRAW INTERRUPT COUNT: N | | |
| | REFERENCE DESTINATION | VALUE | ELEMENT ADDRESS | REFERENCE DESTINATION | VALUE | ELEMENT ADDRESS | | REFERENCE DESTINATION | VALUE | ELEMENT ADDRESS |
| AAAAA | Pa1 | i_a1 | XXXX1Pi | Pam | i_am | XXXXMPi | | Pan | i_an | XXXXNPi |
| | | j_a1 | XXXX1Pj | | j_am | XXXXMPj | | | j_an | XXXXNPj |
| | | | | | k_am | XXXXMPk | | | k_an | XXXXNPk |
| | | | | | l_am | XXXXMPl | | | l_an | XXXXNPl |
| BBBBB | Pb1 | i_b1 | YYYY1Pi | Pbm | i_bm | YYYYMPi | | - | - | - |
| | | j_b1 | YYYY1Pj | | j_bm | YYYYMPj | | | | |
| | | k_b1 | YYYY1Pk | | k_bm | YYYYMPk | | | | |
| ... | | | | | | | | | | |
| MMMMM | Pm1 | i_m1 | ZZZZ1Pi | Pmm | i_mm | ZZZZMPi | | Pmn | i_mn | ZZZZNPi |
| | | j_m1 | ZZZZ1Pj | | j_mm | ZZZZMPj | | | j_mn | ZZZZNPj |
| | | | | | k_mm | ZZZZMPk | | | | |

472

CONTROL DEVICE AND REMOTE CONTROLLER

CROSS REFERENCE TO RELATED APPLICATION

This application is a U.S. national stage application of PCT/JP2013/054274 filed on Feb. 21, 2013, the contents of which are incorporated herein by reference.

TECHNICAL FIELD

The present disclosure relates to a control device and remote controller for displaying images.

BACKGROUND ART

Remote controllers for operating home electric appliances and equipment items conventionally utilize a user interface for switching between display/non-display characters and/or graphics printed on a screen. There is an increasing demand for recent remote controllers to display images presenting graphics, characters or the like on a full-dot liquid crystal display and to provide an easy-to-understand interface. On the other hand, the processing load for drawing images is increasing. Execution of a drawing process causes problems such as a delay in the process to control a home electric appliance or equipment item from a remote controller and an increase of memory capacity to store the images. In order to reduce the processing load of the central processing unit, for example, Patent Literature 1 discloses a technique of installing a draw processing unit internally or externally to the central processing unit as dedicated hardware executing the drawing process.

CITATION LIST

Patent Literature

Patent Literature 1: Unexamined Japanese Patent Application Kokai Publication No. 2010-175638.

SUMMARY OF INVENTION

Technical Problem

However, the technique described in the Patent Literature 1 with the use of a central processing unit having a draw processing unit internally installed requires the program for the central processing unit to be updated as well the screen design of a display image is changed. Therefore, writing errors and/or version errors may occur while the program is updated.

The present disclosure is made under the above circumstance and an objective of the disclosure is to provide a control device and remote controller making it possible to change the screen design of a display image without changing the existing central processing unit and the existing programs of the central processing unit.

Solution to Problem

In order to achieve the above objective, the control device according to the present disclosure comprises:

a storage unit configured to prestore element image data presenting an element image contained in a display image that is an image to be displayed on a display unit in an image data region that is a continuous storage region, and prestore draw command data containing data for creating display data presenting the display image in which the element image is placed in a draw command region that is a continuous storage region;

a central processing unit configured to prestore a screen management table associating drawing condition data presenting a predetermined drawing condition and draw command identification data presenting an address within the storage unit where the draw command data are stored, make reference to the screen management table when the drawing condition is satisfied to identify the draw command identification data associated with the drawing condition data presenting the satisfied drawing condition, and output the identified draw command identification data; and a draw processing unit configured to acquire from the storage unit the draw command data stored at the address presented by the draw command identification data output from the central processing unit, create the display data based on the acquired draw command data, and output the created display data to the display unit.

Advantageous Effects of Invention

According to the present disclosure, element image data and draw command data are each collectively placed in different storage regions of a storage unit. Therefore, even if some contents of the element image data are changed for changing the screen design of a display image, the address where the draw command data are stored is unchanged. Thus, when the screen design of a display image is changed, since there is no need of changing draw command identification data output by the central processing unit, there is no need of changing the details of the processing executed by the central processing unit. Consequently, the screen design of a display image can be changed without changing the existing central processing unit and the existing programs of the central processing unit.

BRIEF DESCRIPTION OF DRAWINGS

FIG. 5 is an illustration showing an example of the screen management table according to Embodiment 1;

FIG. 15 is an illustration showing an example of the screen management table according to Modified Embodiment 2;

FIG. 19 is an illustration showing an example of the interrupt response table according to Embodiment 2;

DESCRIPTION OF EMBODIMENTS

Embodiments of the present disclosure will be described hereafter with reference to the drawings. The same elements are referred to by the same reference numbers throughout the drawings. Duplicate explanation regarding the same element will be omitted.

Embodiment 1

The remote controller according to Embodiment 1 of the present disclosure is a device for the user to operate an air conditioner. Here, the air conditioner is an example among various devices and the object to operate using the remote controller can be a home electric appliance or equipment item such as a lighting apparatus and security system.

Figure 1:
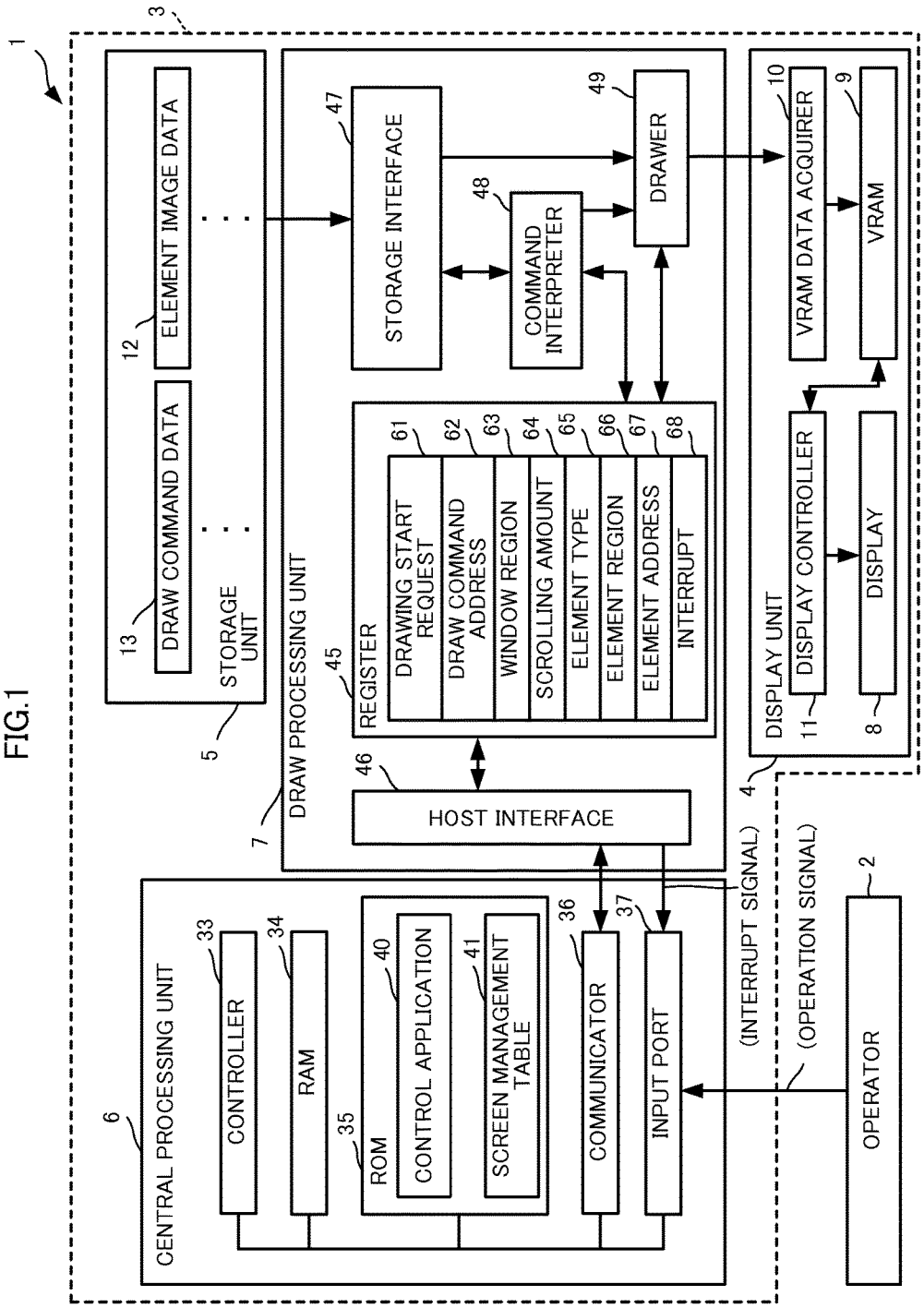
FIG. 1 is a diagram showing the configuration of the remote controller according to Embodiment 1.

A remote controller 1 according to this embodiment comprises, as shown in FIG. 1, an operator 2 and a control device 3.

The operator 2 includes a portion operated by the user and outputs operation signals according to the operation. The operator 2 according to this embodiment comprises multiple buttons the user presses for operation and outputs operation signals according to the pressed button. Moreover, the operator 2 can be a lever, touch panel, or the like.

The control device 3 is a device in charge of total control of the remote controller 1, and comprises, as shown in FIG. 1, a display unit 4, a storage unit 5, a central processing unit 6, and a draw processing unit 7.

The display unit 4 is a device displaying a display image on a screen, and comprises, as shown in FIG. 1, a display 8, a VRAM (video random access memory) 9, a VRAM data acquirer 10, and a display controller 11.

The display 8 is, for example, a 32-gradation gray scale full-dot type liquid crystal device and displays an image of a given number of pixels on a screen of a given size. Here, the display 8 can be one capable of color display. The VRAM 9 is a RAM retaining VRAM data (display data). The VRAM data acquirer 10 is an interface acquiring VRAM data output from the draw processing unit 7 and stores the acquired VRAM data in the VRAM 9. The display controller 11 periodically acquires VRAM data stored in the VRAM 9 and displays a display image presented by the acquired VRAM data on the screen of the display 8.

The storage unit 5 is a device storing various data and comprises, for example, an EEPROM (electrically erasable programmable read only memory), serial flash ROM (read only memory), parallel flash ROM, or the like.

The storage unit 5 stores element image data 12 and draw command data 13 separately at predetermined addresses as shown in FIG. 1.

Figure 2:
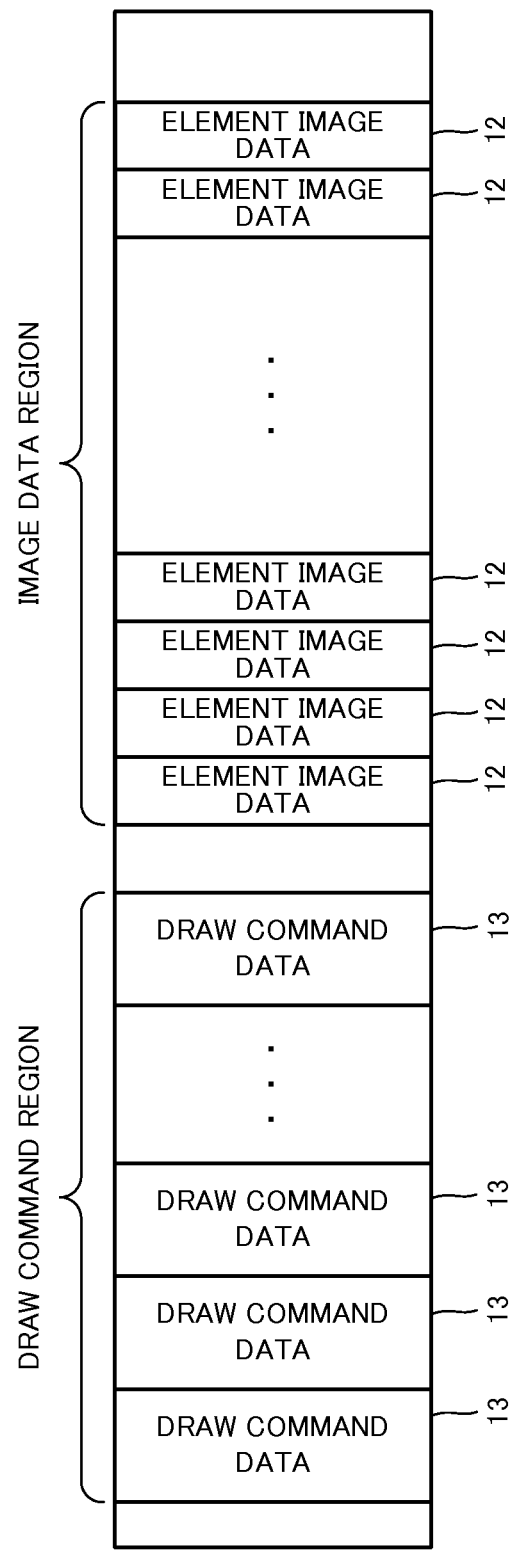
FIG. 2 is an illustration showing exemplary data placement within the storage unit according to Embodiment 1.

Here, the element image data 12 are stored in an image data region successively without spaces as shown in FIG. 2. Moreover, the draw command data 13 are stored in a draw command region successively without spaces. The image data region and draw command region are each a given range of block of storage region of the storage unit 5 that has consecutive addresses starting with a given address.

The element image data 12 contain an image (an element image) presenting an element such as a character, symbol, and graphic included in a display image to be displayed on the entire screen or a partial screen (window) of the display 8.

For example, when the air conditioner is in air cooling operation, the element images are images presenting the characters "C," "O," "O," and "L" indicating the air cooling operation, images presenting the digits "0" to "9" presenting a target temperature and "° C.," and an image presenting the air rate by a graphic. Moreover, a single element image can comprise multiple characters such as "COOL" and an element image can contain a background image.

Figure 3:
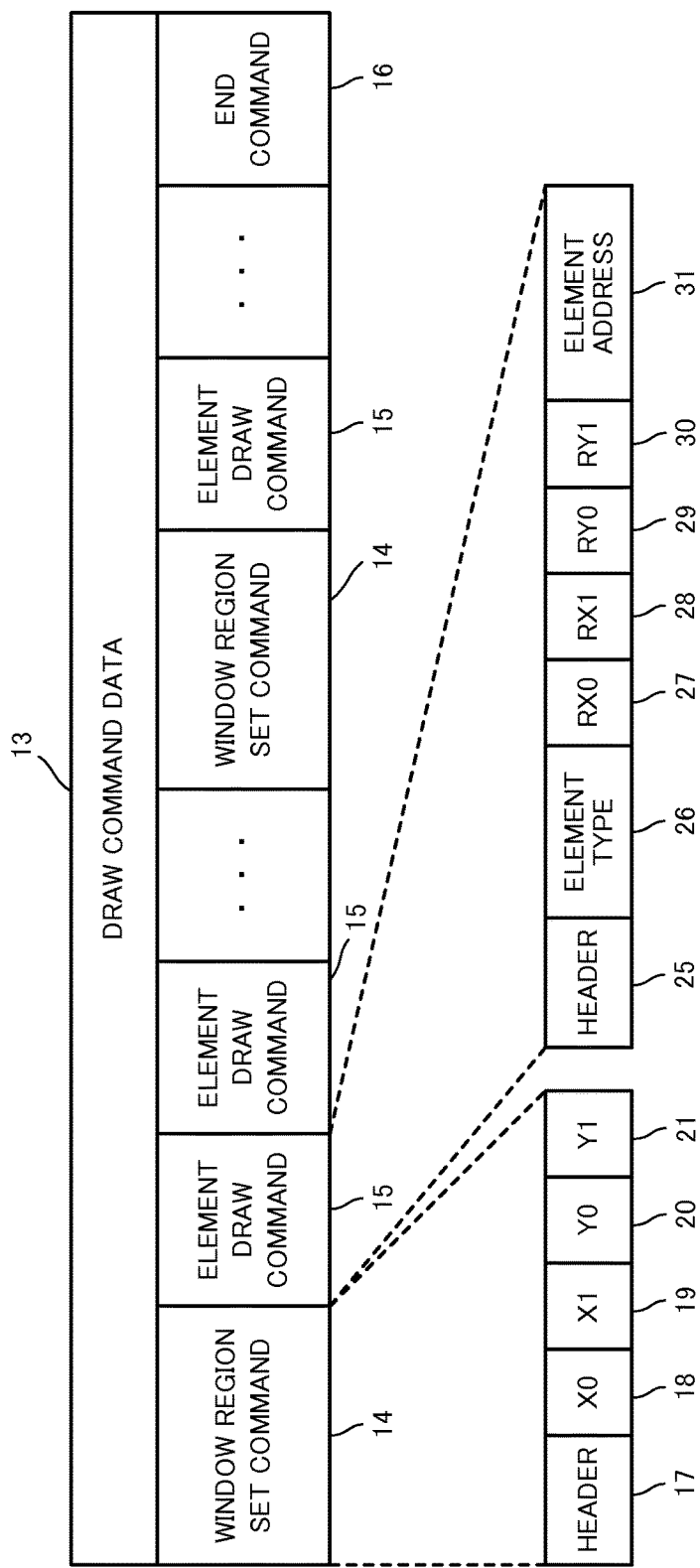
FIG. 3 is an illustration showing an example of the draw command data according to Embodiment 1.

The draw command data 13 contain data necessary for creating a command (a draw command) to be executed for creating display data presenting a display image. The draw command data 13 contain, as shown in FIG. 3, a window region set command 14, an element draw command 15, and an end command 16 presenting the end of the draw command data 13. The data 14 to 16 contained in the draw command data 13 each have a fixed length and therefore the draw command data 13 also have a fixed length.

The window region set command 14 is a command for setting a window region within a virtual region that is the largest region the draw processing unit 7 can handle. The window region set command 14 contains, as shown in the same figure, a header 17 indicating that the elements of the window region set command 14 follow, and virtual region coordinate values 18 to 21 presenting a position within the virtual region at which a rectangular window region is set.

The virtual region coordinate values 18 to 21 contained in the first (leftmost in the same figure) window region set command 14 shown in the same figure present a rectangular region (X0, X1, Y0, Y1). Here, the rectangular region (X0, X1, Y0, Y1) presents a rectangular region of which the minimum and maximum virtual region coordinate values in the direction X are X0 and X1, respectively, and the minimum and maximum virtual region coordinate values in the direction Y are Y0 and Y1, respectively.

Figure 4:
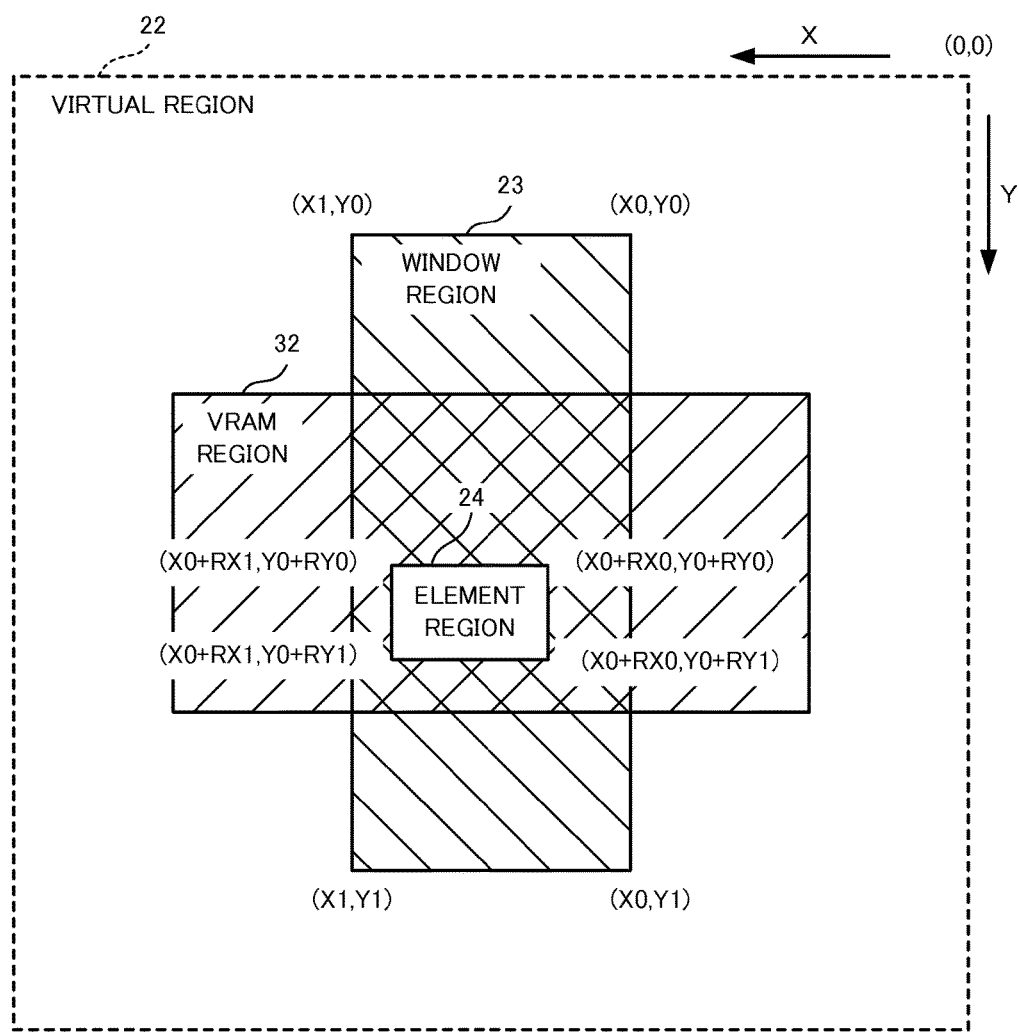
FIG. 4 is an illustration showing exemplary relationship among the regions used by the draw processing unit for creating display data.

FIG. 4 shows an exemplary window region 23 set within a virtual region 22 based on the first window region set command 14. The virtual region coordinate values (X, Y) of this embodiment are presented, as shown in the same figure, by a virtual region coordinate system having the origin at the top right of the same figure and of which the direction X is horizontal and the direction Y is vertical.

The element draw command 15 is a command for placing in the window region 23 an element region 24 that is a rectangular region circumscribing an element image. Moreover, the element region 24 is not necessarily rectangular and can be circular or elliptical as appropriate. The element draw command 15 contains, as shown in FIG. 3, a header 25, an element type 26, relative coordinate values 27 to 30, and an element address 31.

The header 25 indicates that the elements of the element draw command 15 follow. The element type 26 presents the type of image compression used for the element image data 12 such as the GIF and JPEG. The relative coordinate values 27 to 30 present a position within the window region 23 at which the element region 24 is placed. The element address 31 presents an address within the storage unit 5 where the element image data 12 are stored.

Here, the relative coordinate values 27 to 30 exemplify data for identifying a position at which an element image is placed (element placement data). The element address 31 exemplifies data for identifying the element image data 12 (element identification data).

The relative coordinate values 27 to 30 contained in the element draw command 15 following the first window region set command 14 shown in the same figure present a rectangular region (RX0, RX1, RY0, RY1) of which the minimum and maximum relative coordinate values in the direction X are RX0 and RX1, respectively, and the minimum and maximum relative coordinate values in the direction Y are RY0 and RY1, respectively.

The relative coordinate values are the coordinate values presenting a position within the window region set by the window region set command 14. The relative coordinate values (RX, RY) of this embodiment are presented, as shown in FIG. 4, by a relative coordinate system having the origin of relative coordinates at the virtual region coordinates (X0, Y0) at the top right corner of the window region 23 and of which the direction X is horizontal and the direction Y is vertical. The element region 24 in the same figure exemplifies the element region 24 placed according to the relative coordinate values 27 to 30 contained in the element draw command 15 following the first window region set command 14.

Moreover, a VRAM region (display region) 32 is a region corresponding to the screen of the display 8 and set, for example, at the center of the virtual region 22 as shown in the same figure. Therefore, in the same figure, the image in a portion where the window region 23 and VRAM region 32 overlap is a display image. In other words, an element image placed in a portion where the window region 23 and VRAM region 32 overlap is displayed on the screen of the display 8. Furthermore, an element image placed in a portion of the window region 23 that protrudes above or below the VRAM region 32 is not displayed on the screen of the display 8 and will be displayed on the screen of the display 8 as the window region 23 is scrolled.

Returning to FIG. 1, the central processing unit (microcomputer) 6 is a device in charge of total control of the remote controller 1, and comprises a controller 33, a RAM (random access memory) 34, a ROM 35, a communicator 36, and an input port 37.

Interpreting software programs ("programs," hereafter) read from the ROM 35, the controller 33 executes arithmetic operations and controls peripheral functions such as the RAM 34, ROM 35, communicator 36, and input port 37 according to the interpreted contents.

The RAM 34 is a volatile memory used as the work area of the controller 33.

The ROM 35 is a nonvolatile memory storing programs executed by the controller 33 and prestores a control application 40 and a screen management table 41.

The control application 40 is a program for executing the total control (main control) of the remote controller 1 and controlling/operating controlled devices.

The screen management table 41 stores drawing conditions for updating screen contents and the screen contents to display when the drawing conditions are satisfied.

FIG. 5 shows an example of the screen management table 41. The screen management table 41 associates, for each screen number, a draw command address and screen numbers corresponding to operation types. The screen number is a number preassigned to an individual screen for uniquely identifying the type of a screen such as an initial screen and operation input screen. The draw command address is an address within the storage unit 5 where the draw command data 13 for displaying the associated screen are stored. The operation type is the type of an operation conducted by the user on the operator 2. The operation type in this embodiment presents which button is pressed among those identified by buttons 0 to N. The screen number corresponding to the operation type presents the screen number of a screen to display next in accordance with the type of an operation conducted while the screen of the associated screen number (the screen number shown in the leftmost column in FIG. 5) is displayed. Here, the above-mentioned drawing condition corresponds to the displayed screen number and operation type and the above-mentioned screen content corresponds to the draw command address. Moreover, the draw command address exemplifies the draw command identification data for identifying the draw command data 13.

Returning to FIG. 1, the communicator 36 is a communication interface for outputting a host command from the central processing unit 6 to the draw processing unit 7 and reading/writing the register contents of the draw processing unit 7. Specific communication interface systems include clock synchronization serial, asynchronous serial communication, and universal bus systems.

The input port 37 detects operation signals from the operator 2, interrupt signals from the draw processing unit 7, and the like.

The draw processing unit 7 comprises, as shown in FIG. 1, a register 45, a host interface 46, a storage interface 47, a command interpreter 48, and a drawer 49.

The register 45 stores information used by the draw processing unit 7 in the drawing procedure. As shown in the same figure, the register 45 has a drawing start request register 61, a draw command address register 62, a window region register 63, a scrolling amount register 64, an element type register 65, an element region register 66, an element address register 67, and an interrupt register 68.

The drawing start request register 61 is a register for the central processing unit 6 to order the draw processing unit 7 to start the drawing procedure. The draw command address register 62 is a register for setting an address within the storage unit 5 where the draw command data 13 to process are stored. The window region register 63 is a register for setting a window region indicated in the draw command to process. The scrolling amount register 64 is a register for setting the shifting amount s (scrolling amounts) of the window region in the directions X and Y. The element type register 65 is a register for setting the type of an element image to draw. The element region register 66 is a register for setting the drawing destination coordinates (relative coordinates with respect to the window region) of an element image to draw. The element address register 67 is a register for setting an address within the storage unit 5 where the element image to draw is stored. The interrupt register 68 is a register for setting a drawing end flag indicating the end of drawing.

The host interface 46 reads/writes the content of the register 45 at a given location according to a host command received from the central processing unit 6.

Furthermore, the host interface 46 outputs an interrupt signal to the input port 37 of the central processing unit 6 when the drawing end flag in the interrupt register 68 is set.

The storage interface 47 is an interface acquiring from the storage unit 5 the draw command data 13 or element image data 12 in a given data size unit (for example, 1 byte).

The command interpreter 48 monitors the drawing start request register 61. As a flag ordering start of drawing (a drawing start flag) is set in the drawing start request register 61, the command interpreter 48 acquires the draw command data 13 from the storage unit 5 via the storage interface 47. In detail, the command interpreter 48 acquires a succession of draw command data 13 stored in the storage unit 5 from the address set in the draw command address register 62.

Then, the command interpreter 48 interprets the draw command data 13 and stores the data contained in the draw command in the corresponding registers 63 and 65 to 67. In doing so, the command interpreter 48 gives an element drawing request notice to the drawer 49 each time an element draw command of the draw command data 13 is read, and pauses the reading of the draw command data 13. The command interpreter 48 resumes the reading of the draw command data 13 after receiving an element drawing end notice from the drawer 49. Here, the element drawing request notice is a notice indicating a request to start drawing an element image. The element drawing end notice is a notice indicating the end of drawing an element image.

Receiving the above-mentioned element drawing request notice, the drawer 49 executes the element image drawing procedure. In detail, the drawer 49 acquires the element image data 12 from the storage unit 5 via the storage interface 47 based on the address set in the element address register 67. The drawer 49 executes expansion according to the image type presented by the image type data stored in the element type register 65 to create drawing data.

Furthermore, the drawer 49 makes reference to the window region register 63, scrolling amount register 64, and element region register 66, and calculates the coordinate positions on the virtual region at which the individual pixels of the element image are placed according to the referred registers 63, 64, and 66. The drawer 49 creates drawing data of the element image contained in the VRAM region 32, that is the data presenting the coordinate positions of the individual pixels. More specifically, the drawing data are data presenting the pixel values of the individual pixels and in the case of a monochrome image, present each pixel by one bit (white, black).

Figure 6:
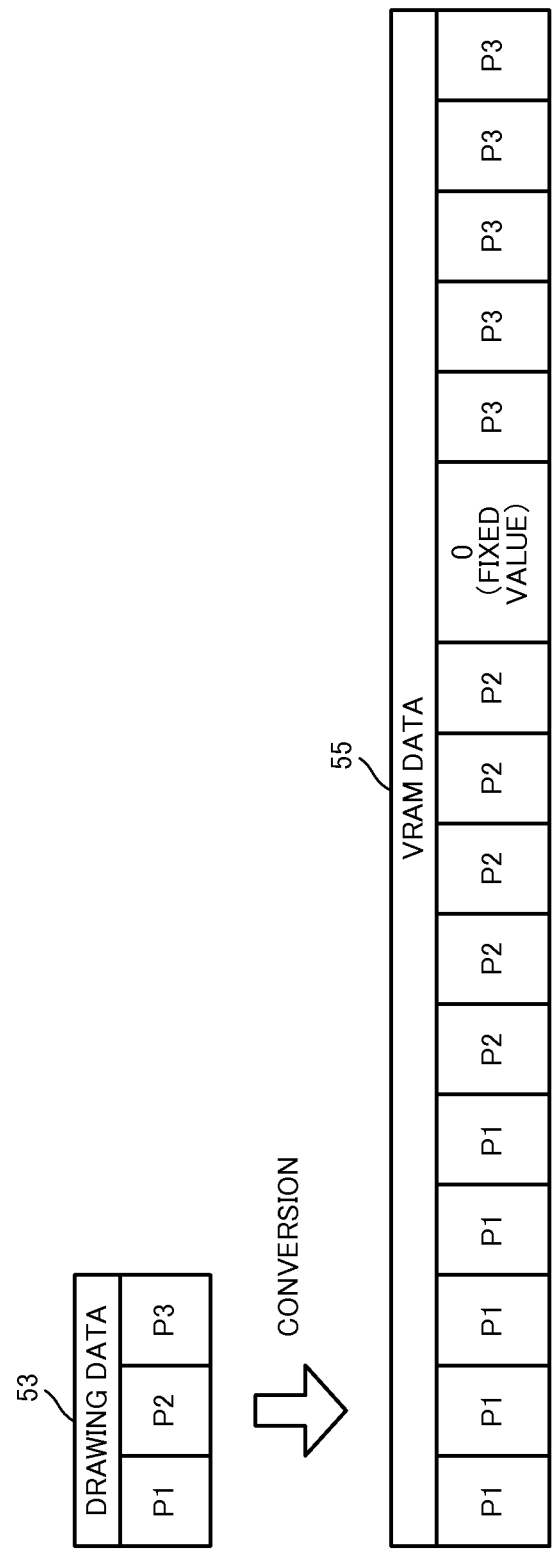
FIG. 6 is an illustration showing an example of the conversion procedure executed by the drawer.

The drawer 49 converts the created drawing data to VRAM data 55 in a format in compliance with the display unit 4. The drawer 49 writes the converted VRAM data 55 via the VRAM data acquirer 10 at the positions on the VRAM 9 corresponding to the coordinate positions presented by the data created along with the drawing data. In this conversion procedure, for example, as shown in FIG. 6, drawing data 53 for three monochrome pixels are converted to 16-bit VRAM data 55.

The configuration of the remote controller 1 according to Embodiment 1 of the present disclosure is described above. The procedures executed by the operating remote controller 1 according to this embodiment will be described hereafter with reference to the drawings.

Figure 7:
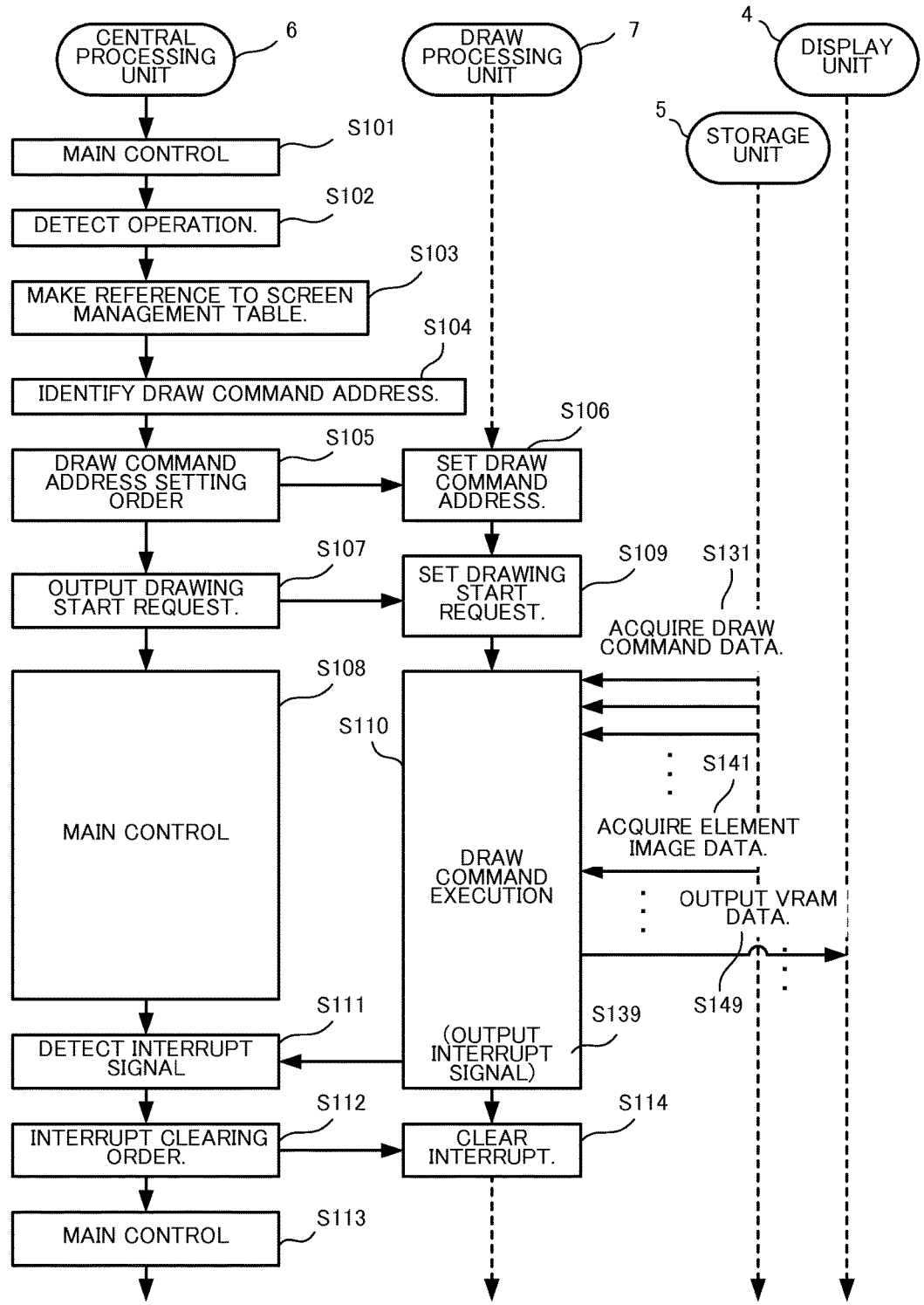
FIG. 7 is a chart showing an exemplary flow of the processing executed by the remote controller according to Embodiment 1.

As shown in FIG. 7, the central processing unit 6 runs the control application 40 to execute the main control procedure (Step S101).

If the user operates the operator 2 during execution of the main control procedure (Step S101), an operation signal is entered in the input port 37. As a result, the central processing unit 6 detects the operation input of the user (Step S102) and pauses the main control procedure.

The central processing unit 6 makes reference to the screen management table 41 (Step S103) and identifies the draw command address of the next display screen according to the satisfied drawing condition based on the screen number of the screen displayed on the display unit 4 and the operation type indicated by the acquired operation signal (Step S104).

For example, it is assumed that the operation type indicated by the operation signal acquired by the central processing unit 6 is a "button 0" and the screen number of the screen displayed at the time is "0." With reference to the screen management table 41 shown in FIG. 5, the screen number of the display screen to draw next is "2." The central processing unit 6 identifies the draw command address "CCCCC" associated with the screen number "2" as the draw command address of the next display screen.

Then, the central processing unit 6 outputs a host command for setting the identified draw command address in the draw command address register 62 to the draw processing unit 7 via the communicator 36 (Step S105). At this point, the central processing unit 6 can further set a fixed value, for example "0," in the scrolling amount register 64.

The host interface 46 of the draw processing unit 7 sets the draw command address corresponding to the entered host command in the draw command address register 62 as shown in FIG. 7 (Step S106).

Then, the central processing unit 6 outputs a host command for writing a drawing start flag in the drawing start request register 61 (a drawing start request) to the draw processing unit 7 (Step S107). Subsequently, the controller 33 resumes the paused main control procedure (Step S108).

In response to a drawing start request being entered, the host interface 46 of the draw processing unit 7 sets a drawing start flag in the drawing start request register 61 (Step S109).

The command interpreter 48 of the draw processing unit 7 monitoring the drawing start request register 61 detects the drawing start flag being set and executes the draw command execution procedure (Step S110).

In the draw command execution procedure (S110) described in detail later, the draw processing unit 7 acquires the draw command data 13 from the storage unit 5 at the address indicated by the draw command address register 62 as shown in the same figure (Step S131). At this point, the draw processing unit 7 increases the content of the draw command address register 62 by +1 each time one byte of the draw command data 13 is acquired. As a result, the command interpreter 48 can acquire the draw command data 13 one byte at a time with reference to the draw command address register 62. The draw processing unit 7 repeats the process to set a window region or the process to draw an element image in accordance with the contents of the draw command data 13 acquired in sequence until the end command 16 is acquired.

When the acquired draw command data 13 are of an element draw command 15, the command interpreter 48 orders the drawer 49 to start the element image drawing procedure after acquisition of one element draw command 15 is completed. The drawer 49 acquires the element image data 12 from the address indicated by the element address register 67 as shown in the same figure (Step S141). At this point, the drawer 49 increases the content of the element address register 67 by +1 each time one byte of the element image data 12 is acquired and acquires the element image data 12 one byte at a time with reference to the element address register 67. The drawer 49 expands the acquired element image data 12 to create drawing data 53. The drawer 49 creates data presenting the coordinate positions of the individual pixels contained in the element image presented by the created drawing data 53.

Figure 9:
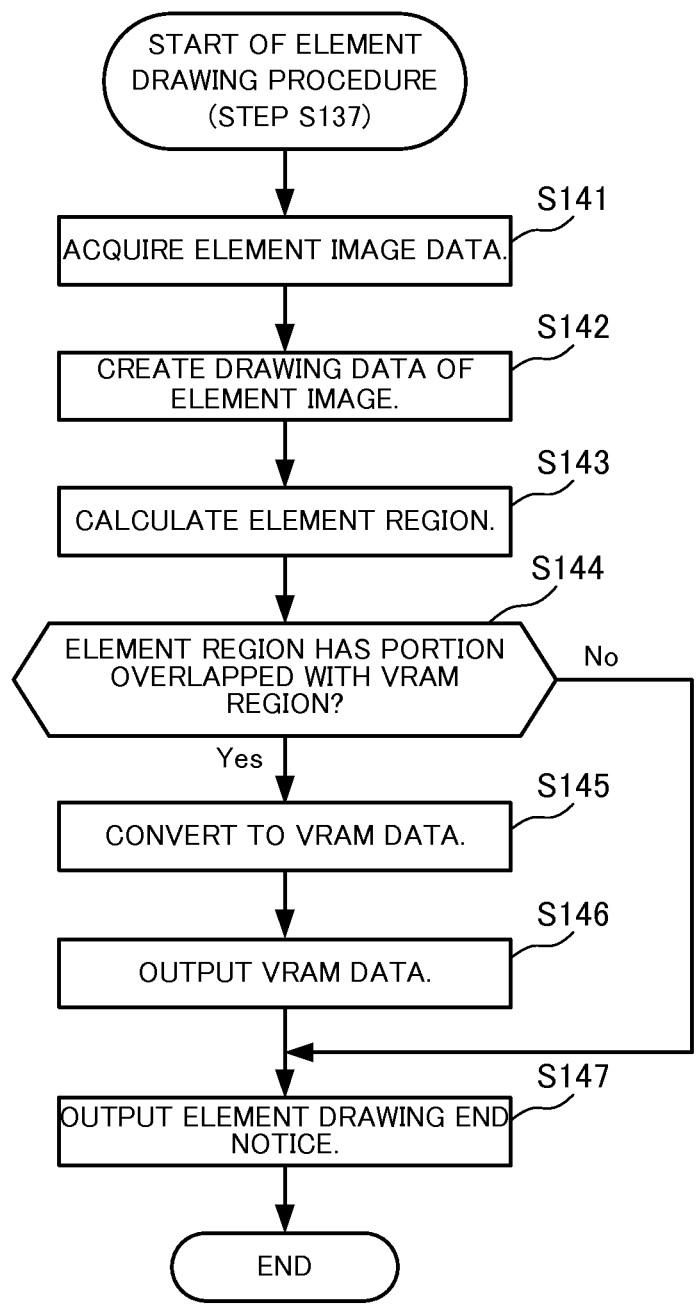
FIG. 9 is a flowchart showing the details of the element drawing procedure shown in FIG. 8.

The drawer 49 converts the drawing data 53 in data format to VRAM data 55 and outputs the obtained, converted VRAM data 55 to the display unit 4 (Step S146 shown in FIG. 9). After processing all pixels contained in the element image data 12 in process, the drawer 49 gives an element drawing end notice to the command interpreter 48. In response to the element drawing end notice, the command interpreter 48 resumes acquisition of the draw command data 13.

After acquiring an end command 16, the command interpreter 48 sets a drawing end flag indicating that the drawing process is over in the interrupt register 68. As a result, the host interface 46 detects the set drawing end flag and outputs an interrupt signal to the central processing unit 6 (Step S139).

Detecting the interrupt signal (Step S111), the central processing unit 6 pauses the main control procedure, and outputs a host command for clearing the interrupt register 68 (a drawing end flag clearing order) to the draw processing unit 7 via the communicator 36 (Step S112). Then, the controller 33 resumes the main control procedure (Step S113).

Acquiring an end interrupt clearing order from the central processing unit 6, the host interface 46 of the draw processing unit 7 clears the interrupt register 68 and ceases the interrupt signal (Step S114).

As apparent from the above explanation, the procedure executed by the central processing unit 6 to display a display image on the display 8 comprises the processing from detection of an operation (Step S102) to output of a drawing start request (Step S107), acquisition of an interrupt signal (Step S111), and interrupt clearing order (Step S112). This process is significantly smaller than the process to create draw command data as in the prior art. Therefore, the processing load of the central processing unit 6 to display a display image on the display 8 can significantly be reduced.

The draw command execution procedure (Step S110) executed by the draw processing unit 7 will be described in detail below.

The draw command execution procedure (Step S110) starts when the command interpreter 48 detects a drawing start flag in the drawing start request register 61. The command interpreter 48 having detected a drawing start flag acquires the draw command data 13 placed at the address stored in the draw command address register 62 from the storage unit 5 via the storage interface 47 (Step S131 shown in FIG. 7).

In detail, the command interpreter 48 increases the content of the draw command address register 62 by +1 after acquiring one byte of the draw command data 13 from the storage unit 5 via the storage interface 47. Repeating this operation, the command interpreter 48 acquires the draw command data 13 one byte at a time. For the purpose of simplicity, description regarding the repeated acquisition of draw command data is omitted in the following explanation. However, the following processing can be executed as appropriate while the draw command data 13 are acquired one byte at a time.

Figure 8:
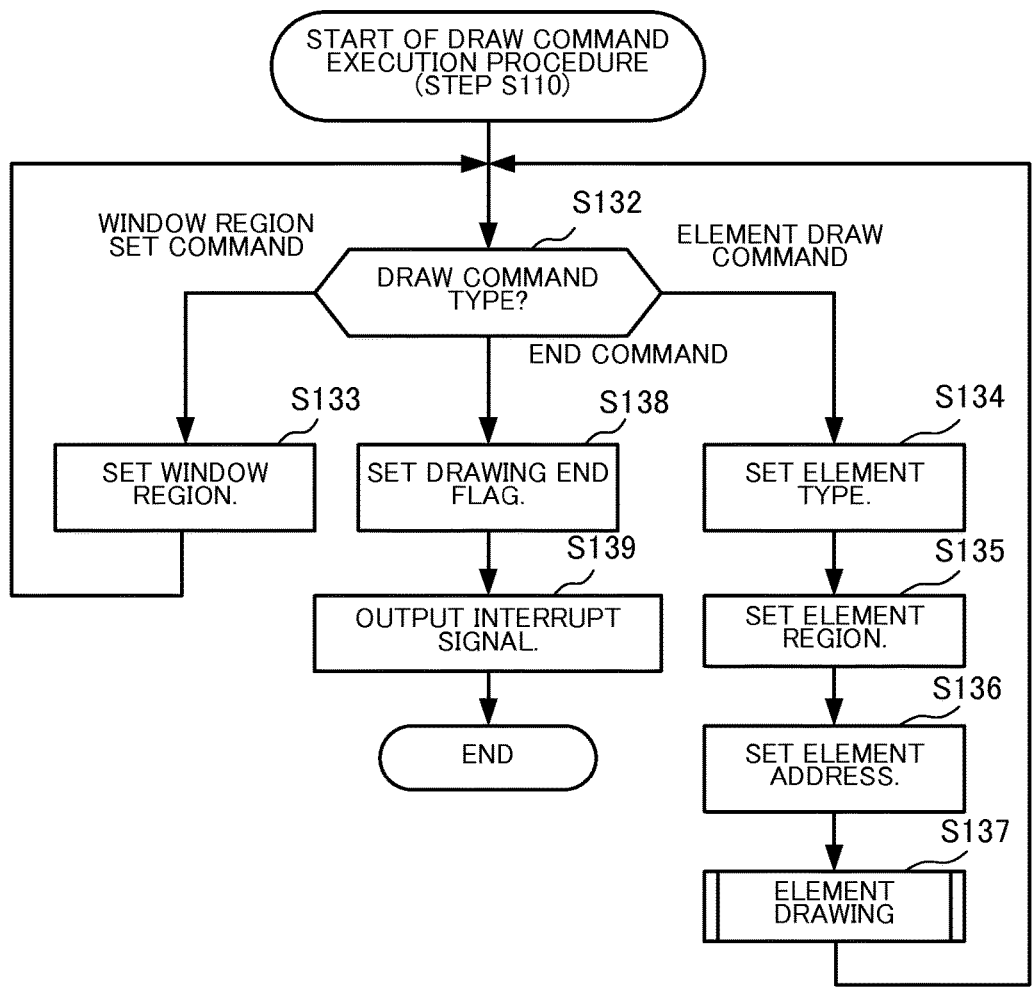
FIG. 8 is a flowchart showing the details of the draw command execution procedure shown in FIG. 7.

As shown in FIG. 8, the command interpreter 48 interprets the headers 17 and 25 contained in the draw command data 13 and determines whether the command type is a window region set command 14, an element draw command 15, or an end command 16 (Step S132).

If the draw command type is a window region set command 14 in the Step S132, the command interpreter 48 sets the window region contained in the window region set command in the window region register 63 (Step S133). Subsequently, the command interpreter 48 returns to the Step S132.

For example, it is assumed that the draw command data 13 contain the contents shown in FIG. 3 and the command interpreter 48 identifies a window region set command 14 based on the header 17 in the Step S132. In such a case, the command interpreter 48 sets the window region (X0, X1, Y0, Y1) in the window region register 63 in the Step S133.

If the draw command type is an element draw command 15 in Step S132, the command interpreter 48 sets the element type 26, element regions 27 to 30, and element address 31 contained in the element draw command 15 in the element type register 65, element region register 66, and element address register 67, respectively (Steps S134 to S136). As a result, after acquisition of one element draw command 15 is completed, the command interpreter 48 outputs an element drawing request notice to the drawer 49.

For example, it is assumed that the draw command data 13 contain the contents shown in FIG. 3 and the command interpreter 48 identifies an element draw command 15 based on the header 25 in the Step S132. In such a case, the command interpreter 48 sets the element region (RX0, RX1, RY0, RY1) in the element region register 66 in the Step S135.

As an element drawing request notice is entered, the drawer 49 starts the element image drawing procedure (Step S137). The element drawing procedure (Step S137) will be described with reference to FIG. 9.

As shown in the same figure, the drawer 49 first acquires the element image data 12 at the address set in the element address register 67 from the storage unit 5 via the storage interface 47 (Step S141). At this point, the drawer 49 increases the content of the element address register 67 by +1 each time one byte of the element image data 12 is acquired.

The drawer 49 expands the acquired element image data 12 by a method corresponding to the element type 26 set in the element type register 65 to create element image drawing data 53 (Step S142).

The drawer 49 calculates an element region 24 presented by virtual region coordinate values on the virtual region 22 based on the data stored in the window region register 63, scrolling amount register 64, and element region register 66 (Step S143).

For example, when the window region is a rectangular region (X0, X1, Y0, Y1) in virtual region coordinate value, the scrolling amount is SX in the direction X and SY in the direction Y, and the element region 24 is a rectangular region (RX0, RX1, RY0, RY1) in relative coordinate value, the calculated position of the element region 24 presented by the virtual region coordinate values is a rectangular region (X0+RX0+SX, X0+RX1+SX, Y0+RY0+SY, Y0+RY1+SY) in virtual region coordinate value. FIG. 4 shows the element region 24 when both the SX and SY are 0.

When the element region 24 corresponding to the element draw command 15 to process has a portion (region) overlapped with the RAM region 32 (Step S144; Yes), the drawer 49 creates drawing data 53 presenting the element image within the overlapped region. The drawer 49 converts the drawing data to VRAM data 55 as described above (Step S145). The drawer 49 outputs the obtained, converted VRAM data 55 to the display control unit 4 (Step S146).

After output of all of the VRAM data 55 presenting the element image within the region overlapped with the VRAM region 32 is completed (Step S146) or when the element region 24 has no region overlapped with the VRAM region 32 (Step S144; No), the drawer 49 outputs an element drawing end notice to the command interpreter 348 (Step S147). Then, the drawer 49 ends the element drawing procedure (Step S137). Receiving the element drawing end notice, the command interpreter 348 returns to the Step S132.

As the element drawing procedure (Step S137) is executed as described above, the VRAM data 55 presenting an element image and the display position of the element image on the screen of the display 8 are created and output to the display unit 4.

Here, although not shown, the VRAM data acquirer 10 of the display unit 4 acquires the VRAM data 55 presenting an element image. Then, the VRAM data acquirer 10 stores the VRAM data 55 in the VRAM 9 so that the element image is placed at the position on the screen of the display 8 corresponding to the position of the element region 24 within the VRAM region 32. Consequently, the element image is placed at a proper position and displayed on the display 8 by the display controller 11.

From then on, the window region set command 14 and element draw command 15 are similarly processed, whereby a screen displaying multiple element images in one window region and/or displaying an element image in another window region is displayed on the display 8.

Returning to FIG. 8, if the draw command type is an end command 16 in the Step S132, the command interpreter 48 sets a drawing end flag in the interrupt register 68 (Step S138).

Detecting a drawing end flag being set, for example, by monitoring the interrupt register 68, the host interface 46 outputs an interrupt signal to the central processing unit 6 (Step S139). Then, the draw processing unit 7 ends the draw command execution procedure (Step S110).

It is a general practice to use a common remote controller for air conditioners at multiple destinations in some cases. In such cases, the screen contents of a display image displayed when a specific drawing condition is satisfied may be changed depending on the destination. For example, the screen contents are changed for conforming to the culture and/or display language of the destination.

Figure 10:
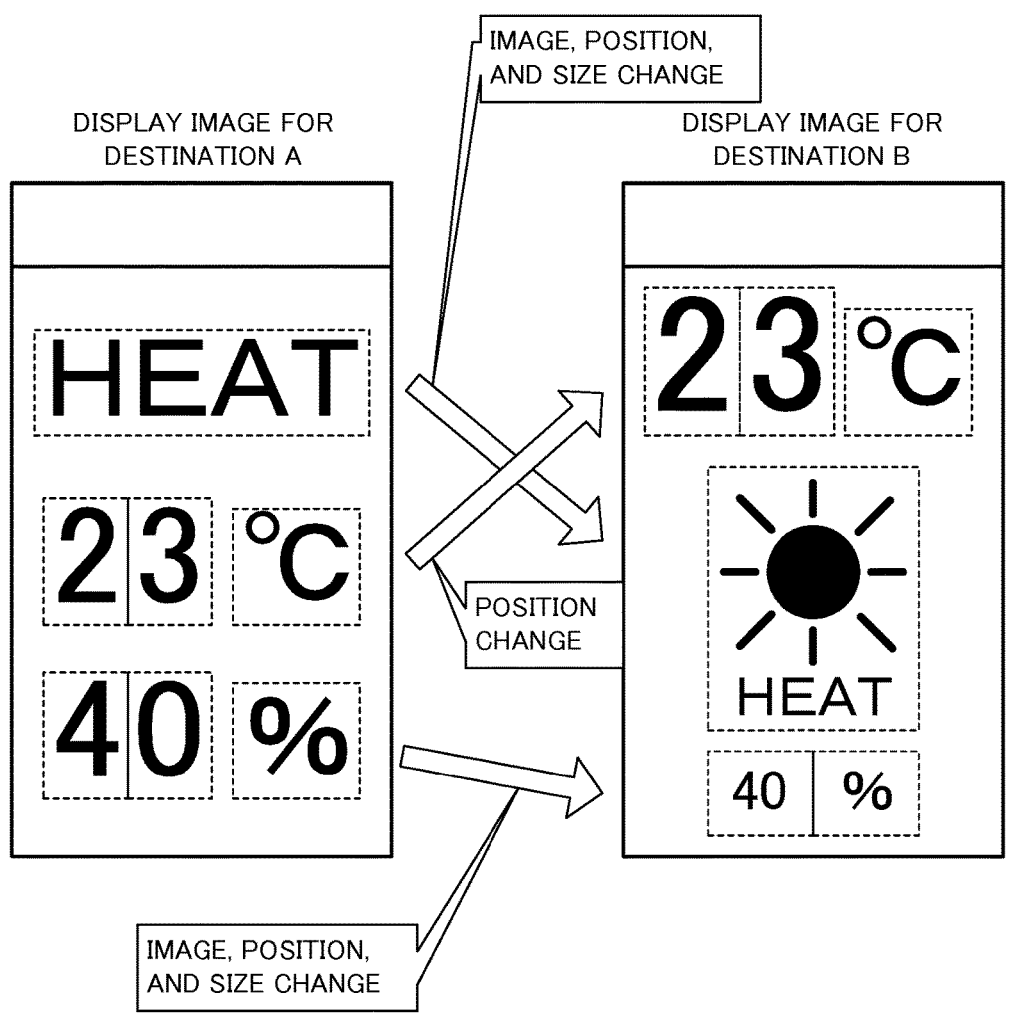
FIG. 10 is an illustration showing an exemplary case in which the screen contents of a display image displayed under the same drawing condition are changed depending on the destination.

FIG. 10 is an illustration showing an exemplary case in which the screen contents of a display image displayed under the same drawing condition are changed depending on the destination. The figure shows a case in which the screen contents of a display image at a destination A are changed to those at a destination B.

In detail, the element image presenting the operation mode is changed from "HEAT" at the destination A to "an icon+HEAT" at the destination B and additionally the position and size of the element image are changed. With this change, the data size of the element image data 12 presenting the operation mode is generally increased. Therefore, the storing locations of the element image data 12 following the element image data 12 presenting the operation mode are changed. If the change of the storing location of the element image data 12 presenting the operation mode affects the storing location of the element image data 12 presenting, for example, a number, the element address 31 contained in the draw command data 13 has to be changed. Furthermore, since the size and display position of the element image presenting the operation mode are changed, the relative coordinate values 27 to 30 ("RX0, RX1, RY0, RY1" in FIG. 2) of the element draw command 15 are changed.

As for the digits and "° C." of the temperature display, only the display position is changed. Then, the relative coordinate values 27 to 30 of the draw command data 13 are changed.

As for the digits and "%" of the humidity display, the element image and the size and display position thereof are changed like the operation mode. Then, the element address 31 and relative coordinate values 27 to 30 of the draw command data 13 are changed.

As described above, along with the change in screen contents shown in FIG. 10, the contents of the element image data 12 stored in the storage unit 5, the location (address) where the element image data 12 are stored, the relative coordinate values 27 to 30 contained in the draw command data 13, and the element address 31 contained in the draw command data 13 are changed. At this point, the draw command data 13 are changed only in values contained therein; the data size thereof does not change. Therefore, the draw command identification data output by the central processing unit 6 are the same before and after the screen contents are changed.

Embodiment 1 of the present disclosure is described above.

According to this embodiment, the remote controller 1 comprises the draw processing unit 7 and storage unit 5 saving the draw command data 13 and element image data 12 externally to the central processing unit 6. Then, the processing to create a screen (calculate the element region 24, acquire and expand the element image data 12, convert to the VRAM data 55, and output to the display unit 4) is executed by the draw processing unit 7. The central processing unit 6 executes only the processing that can be completed in a short time such as identification of a draw command address corresponding to an operation signal, drawing start request to the draw processing unit 7, interrupt signal detection after the drawing is over, and interrupt clearing order. Therefore, not only when an element image is changed but also when the display position and/or size of an element image is changed, the control application 40 executed by the central processing unit 6 does not need to be altered.

Therefore, when only the screen design of a display image is changed as appropriate after the main development has completed or for each destination of the remote controller 1, the screen design can be changed without accessing the storage regions of the ROM 35 or the like of the central processing unit 6 where the control application 40 is retained. Consequently, the risk of failure such as data writing errors and mismatched versions can be prevented.

This embodiment can be modified as followed.

For example, in Embodiment 1, the remote controller 1 draws an image as necessary upon reception of an operation signal based on the user operation. However, the trigger for the remote controller 1 to draw an image is not limited to reception of an operation signal.

For example, a display image can be displayed on the display 8 as necessary when the controller 33 executing the control application 40 satisfies a condition defined by a control logic contained in the control application 40. More specifically, for example, it is possible to display a specific display image on the display 8 for notifying the user of a failure of a device or the remote controller 1, or display a changed temperature according to the room temperature change when the current room temperature is displayed on the screen of the display 8.

Furthermore, for example, the host command for setting a draw command address contains a host command for setting a fixed value in the scrolling amount register 64 in the embodiment. However, the method of setting a scrolling amount in the scrolling amount register 64 is not limited thereto.

For example, it is possible that a given scrolling amount is included in the draw command data 13 and the command interpreter 48 sets the scrolling amount in the scrolling amount register 64.

Furthermore, for example, it is possible to output a host command for setting a scrolling amount in accordance with the user operation along with the host command for setting a draw command address. For example, upon reception of an operation signal corresponding to scrolling within a given time period since reception of an operation signal satisfying a drawing condition, ordered by the controller 33, the communicator 36 can output a host command for saving in the scrolling amount register 64 scrolling amount data presenting the direction and amount corresponding to the operation signal (a host command for setting a scrolling amount) along with a host command for setting a draw command address. Here, the operation signal presenting scrolling favorably contains the direction and amount of scrolling.

Modified Embodiment 1

Furthermore, for example, as described with reference to FIGS. 8 and 9, the VRAM data 55 are output to the display unit 4 as necessary each time the element drawing procedure (Step S137) is executed in Embodiment 1. However, it is possible that the drawer 49 stores the drawing data 53 until all element draw commands 15 contained in one set of draw command data 13 are executed and then the drawing data 53 are converted to the VRAM data 55 and the VRAM data 55 are output to the display unit 4 as necessary.

Figure 11:
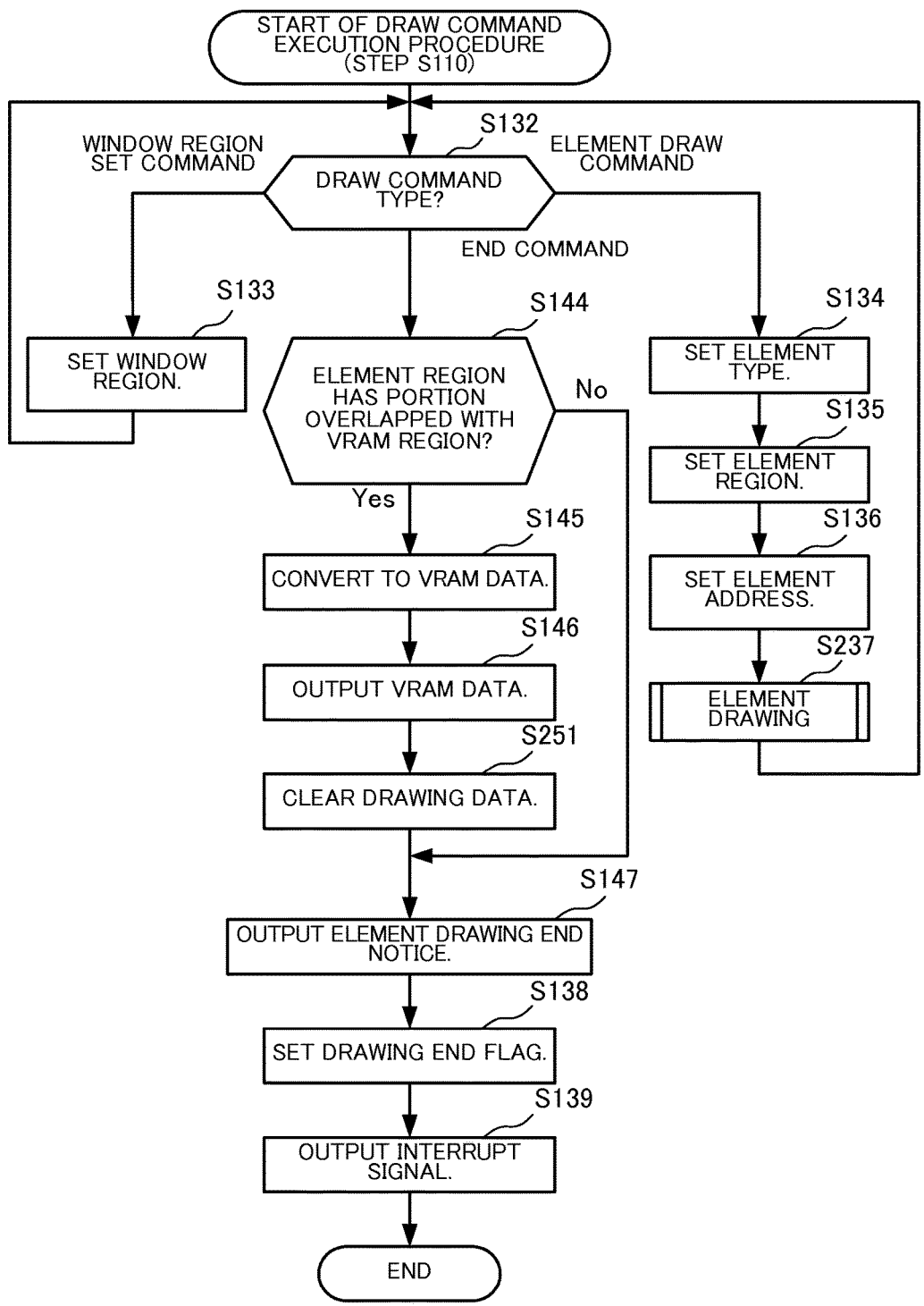
FIG. 11 is a flowchart showing exemplary modified details of the draw command execution procedure shown in FIG. 7.
Figure 12:
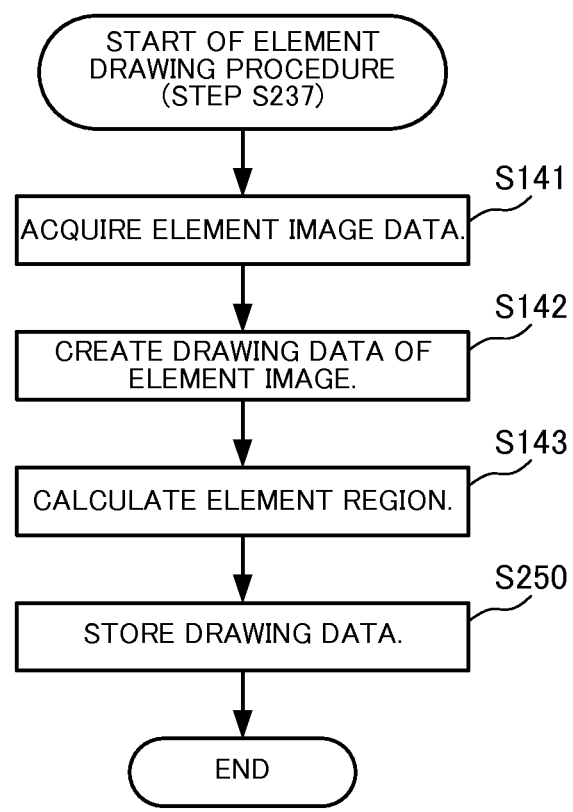
FIG. 12 is a flowchart showing the details of the element drawing procedure shown in FIG. 11.

FIGS. 11 and 12 show an exemplary flow of the processing executed by the draw processing unit 7 according to this modified embodiment. The draw command execution procedure (Step S110) is, as shown in FIG. 11, different in details of the element drawing procedure (Step S237). In the element drawing procedure (Step S237), as shown in FIG. 12, after the element region is calculated (Step S143), the drawer 49 stores the drawing data 53 containing the identified element region (Step S250).

Returning to FIG. 11 again, if the command interpreter 48 determines that the draw command is an end command 16 (Step S132; END COMMAND), the drawer 49 of this modified embodiment executes the processing from the determination of whether an overlapped portion is present (Step S144) to output of the VRAM data (Step S146) before setting an end interrupt (Step S138). Subsequently, the drawer 49 clears the stored drawing data 53 (Step S251) and outputs an element drawing end notice (Step S147).

According to this modified embodiment, all element images contained in one set of draw command data 13 can be displayed on the display 8 at a time instead of individual element images being displayed on the display 8 in sequence. Also with this, the same efficacy as Embodiment 1 can be achieved.

Modified Embodiment 2

In Embodiment 1, the draw command data 13 contain all of the window region (virtual region coordinate values 18 to 21), element type 26, element region (relative coordinate values 27 to 30), and element address 31 presented by the data retained in the register 45. However, some of those can be stored in the registers 63 and 65 to 67 by the central processing unit 6. In this modified embodiment, the case in which the element address data among the above data contained in the draw command data 13 in Embodiment 1 are stored in the element address register 67 from the central processing unit 6 is described.

Figure 13:
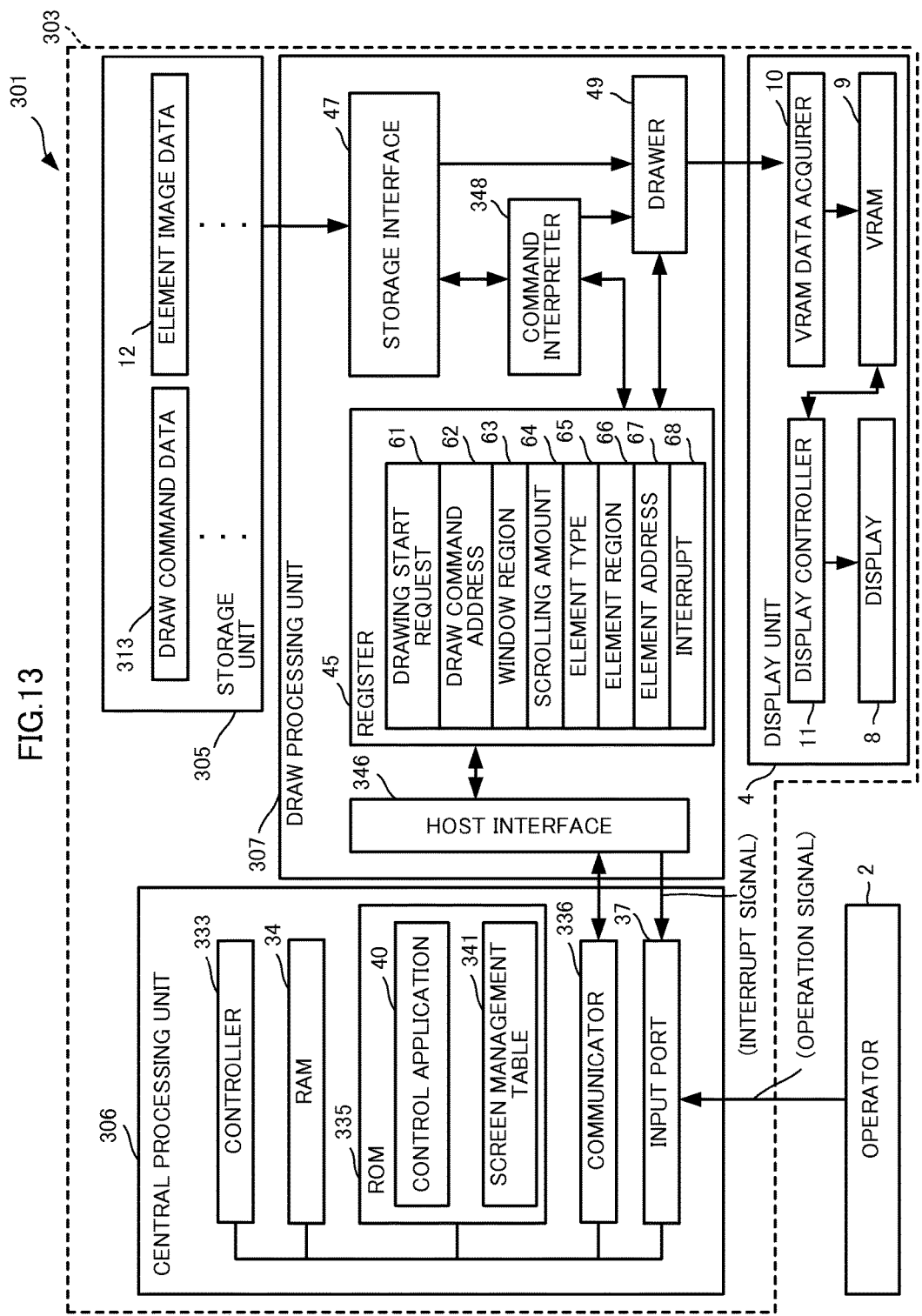
FIG. 13 is a diagram showing the configuration of the remote controller according to Modified Embodiment 2.

A remoter controller 301 according to this modified embodiment comprises, as shown in FIG. 13, a control device 303 different from the control device 3 according to Embodiment 1 in having a storage unit 305, a central processing unit 306, and a draw processing unit 307.

Figure 14:
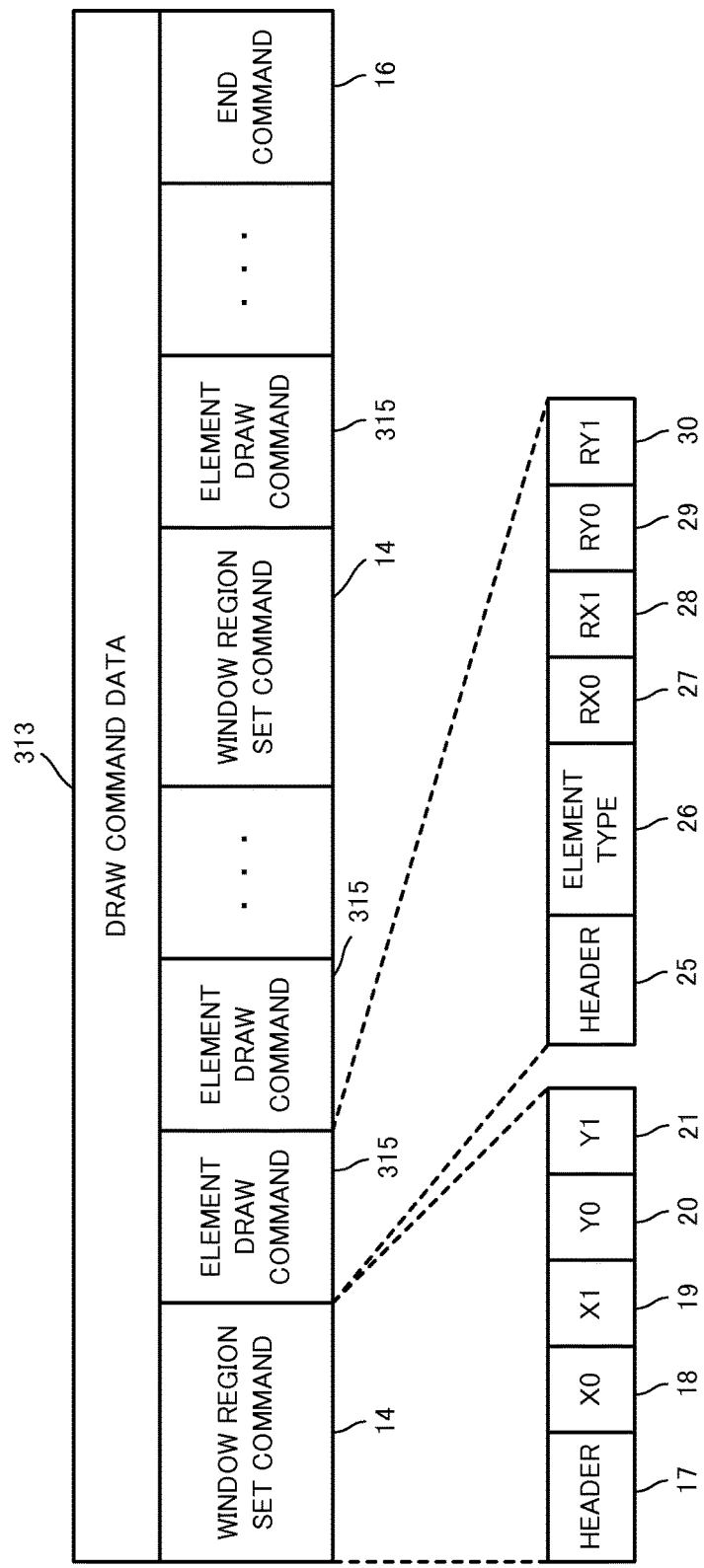
FIG. 14 is an illustration showing an example of the draw command data according to Modified Embodiment 2.

The storage unit 305 stores draw command data 313 in place of the draw command data 13 according to Embodiment 1. The draw command data 313 are different from the draw command data 13 according to Embodiment 1 in that an element draw command 315 does not contain the element address 31 as shown in FIG. 14.

The central processing unit 306 comprises a ROM 335 storing a screen management table 341, a controller 333, and a communicator 336 in place of the ROM 35 storing the screen management table 41, controller 33, and communicator 36 according to Embodiment 1.

The screen management table 341 associates element addresses with a screen number in addition to a draw command address as shown in FIG. 15. The element addresses are the addresses within the storage unit 305 of the element image data 12 presenting element images contained in a display image corresponding to the screen number.

The controller 333 makes reference to the screen management table 341 and identifies an element address in additions to a draw command address. Then, the controller 333 causes the communicator 336 to output an order (a host command) containing the identified draw command address and element address.

Like the communicator 36 according to Embodiment 1, ordered by the controller 333, the communicator 336 outputs a draw command address setting order to the draw processing unit 307. In addition, the communicator 336 outputs to the draw processing unit 307 a host command (an element address setting order) for setting the identified element address in the element address register 67.

The draw processing unit 307 comprises a host interface 346 and a command interpreter 348 in place of the host interface 46 and command interpreter 48 according to Embodiment 1.

The host interface 346 acquires the element address setting order in addition to data input/output by the host interface 46 according to Embodiment 1. Then, the host interface 346 sets the element address contained in the acquired element address setting order in the element address register 67.

The command interpreter 348 interprets the draw command data 313 and sets the window region, element type, and element region in the corresponding registers 63, 65, and 66, respectively.

The configuration of the remote controller 301 according to this modified embodiment is described above. The processing executed by the remote controller 301 will be described hereafter with reference to the drawings.

Figure 16:
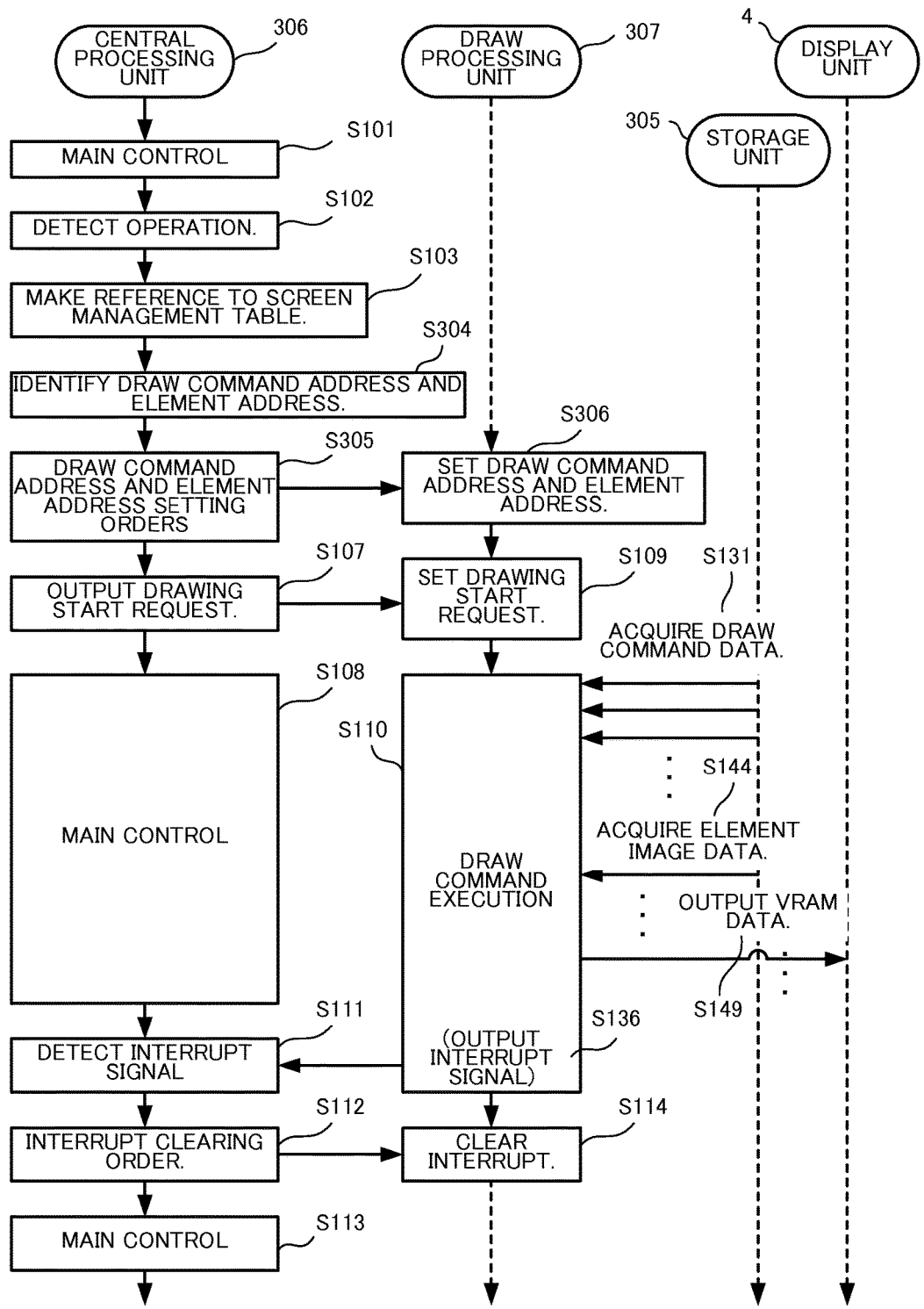
FIG. 16 is a chart showing an exemplary flow of the processing executed by the remote controller according to Modified Embodiment 2.

In this modified embodiment, as shown in FIG. 16, after making reference to the screen management table (Step S103), the central processing unit 306 makes reference to the screen management table 341 to identify the draw command address and element address (Step S304). The element address identified at this point is an element address associated with the same screen number as the draw command address identified by the same method as in Embodiment 1.

Ordered by the controller 333, the communicator 336 outputs to the draw processing unit 307 a draw command address setting order and an element address setting order (Step S305).

The host interface 346 of the draw processing unit 307 acquires the draw command address setting order and element address setting order. Then, the host interface 346 sets the draw command address and element address identified by the controller 333 in the draw command address register 62 and element address register 67, respectively (Step S306).

This modified embodiment yields the same efficacy as Embodiment 1. Furthermore, the data size of the draw command data 313 can be smaller than the data size of the draw command data 13 in Embodiment 1. Thus, the storage unit 305 having a smaller storage capacity than in Embodiment 1 can be used to configure the remoter controller 301.

Embodiment 2

In this embodiment, as in Modified Embodiment 2 of Embodiment 1, some of the window region data, element type data, element region data, and element address data contained in the draw command data 13 according to Embodiment 1 are stored in the registers by the central processing unit. In this embodiment, instead of being contained in the screen management table 341 as in Modified Embodiment 2, some of the above data are created by the central processing unit executing a given program. In this embodiment, the case in which the central processing unit creates the element address as some of the above data is described.

Figure 17:
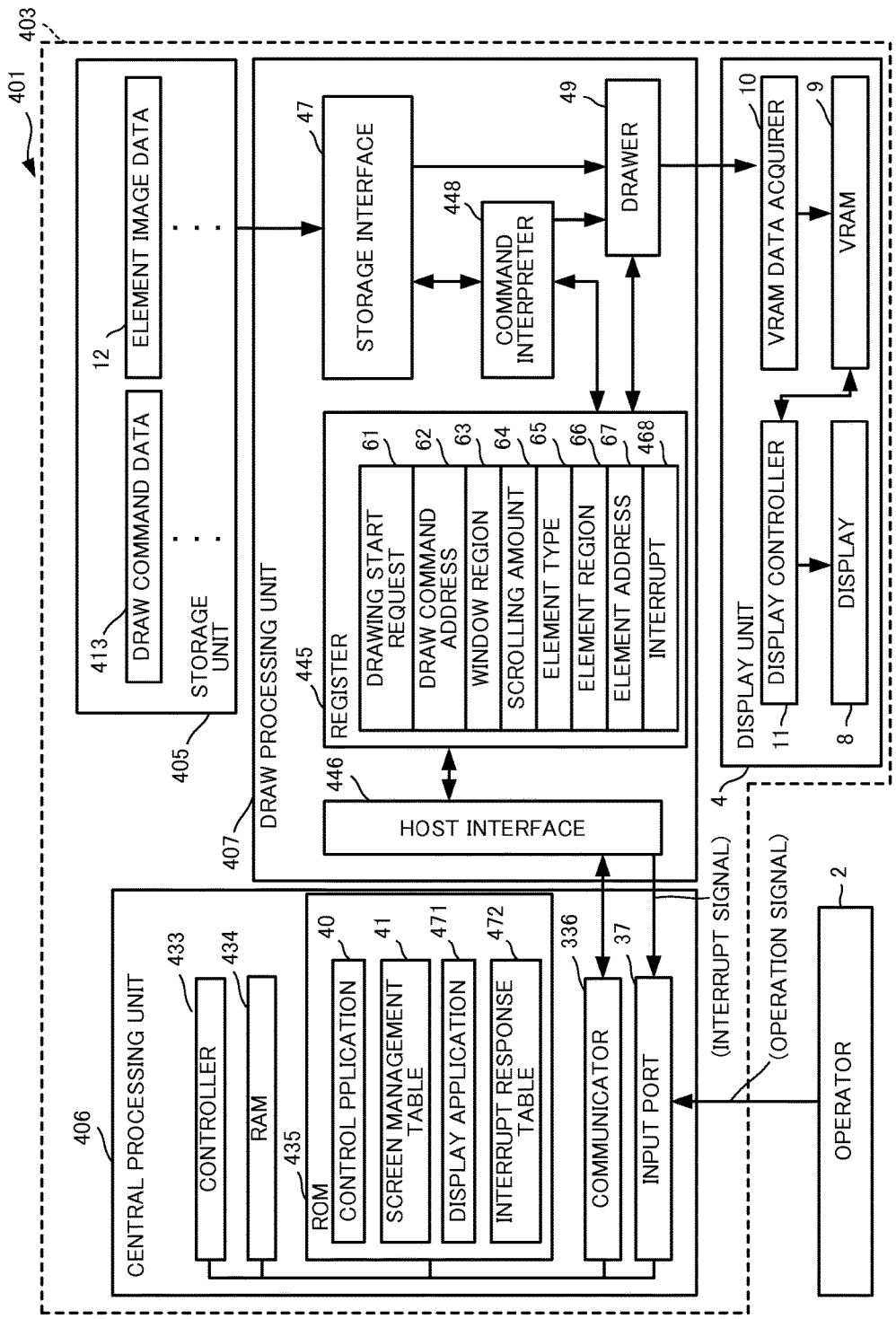
FIG. 17 is a diagram showing the configuration of the remote controller according to Embodiment 2.

A remote controller 401 according to this embodiment comprises, as shown in FIG. 17, a control device 403 different from the control device 303 according to Modified Embodiment 2 in having a storage unit 405, a central processing unit 406, and a draw processing unit 407.

The storage unit 405 stores the same element image data 12 as in Embodiment 1, and draw command data 413 in place of the draw command data 313 according to Modified Embodiment 2. The element image data 12 are stored in an image data region successively without spaces as in Embodiment 1. The draw command data 413 are stored in a draw command region like the draw command data 13 of Embodiment 1.

Figure 18:
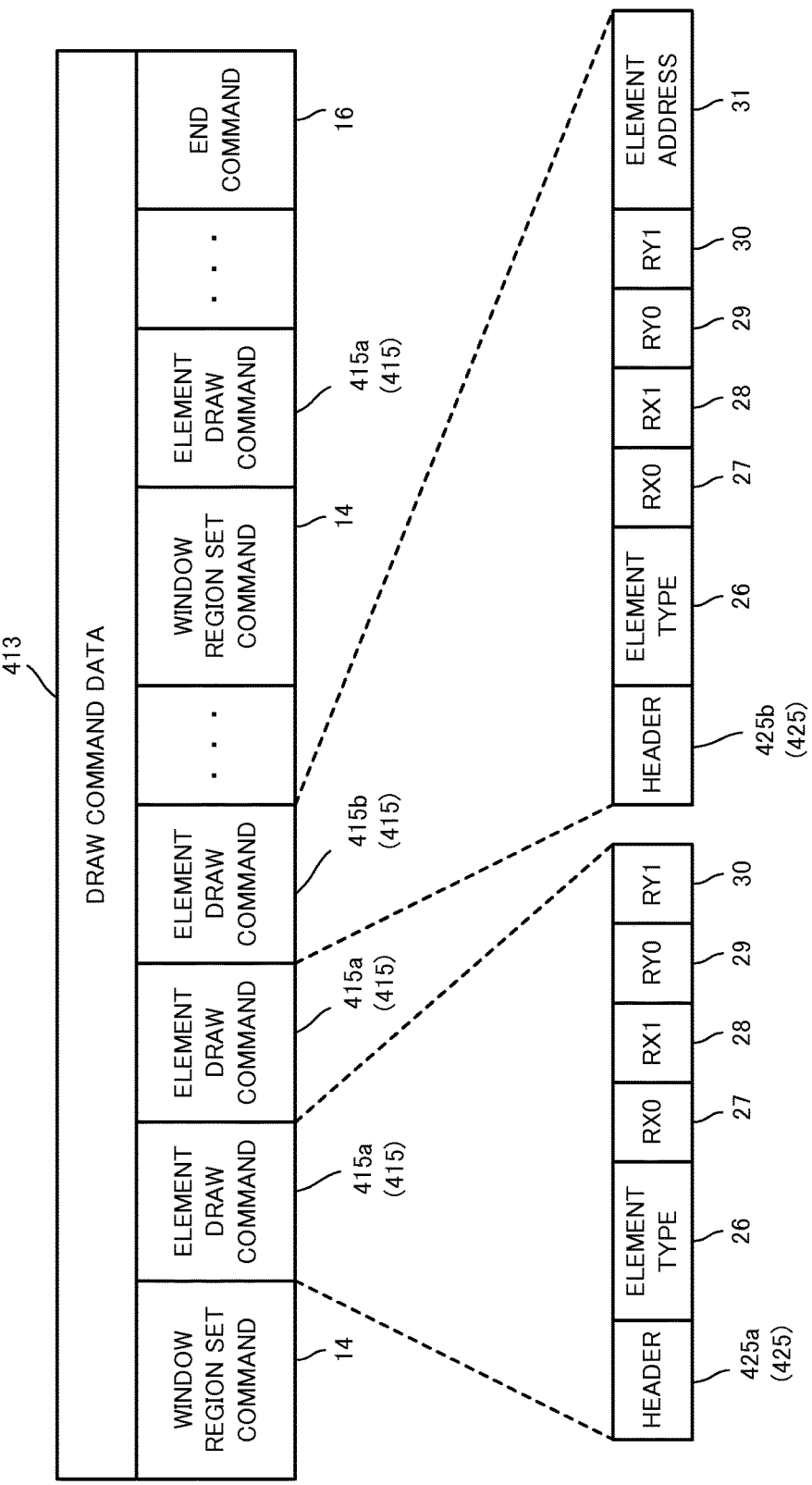
FIG. 18 is an illustration showing an example of the draw command data according to Embodiment 2.

The draw command data 413 include, unlike the draw command data 13 of Embodiment 1, element draw commands 415a and 415b as shown in FIG. 18. When collectively referred to, the element draw commands 415a and 415b are notated hereafter as the element draw commands 415.

The headers 425a and 425b of the element draw commands 415 contain a flag (a draw interrupt flag) indicating whether to make a request for the central processing unit 406 to set element address data (set an element address) in the element address register 67. When collectively referred to, the headers 425a and 425b of the element draw commands 415 are notated hereafter as the headers 425.

The first and second element draw commands 415a following the first window region set command 14 in FIG. 18 exemplify a header 425a containing a draw interrupt flag indicating a request for the central processing unit 406 to set an element address (for example "1").

On the other hand, the third element draw command 415b in FIG. 18 following the first window region set command 14 in FIG. 18 exemplifies a header 425b containing a draw interrupt flag indicating no request for the central processing unit 406 to set an element address (for example "0").

As shown in the same figure, the element draw command 415a containing the header 425a of which the draw interrupt flag is 1 does not contain the element address 31, and the element draw command 415b containing the header 425b of which the draw interrupt flag is 0 contains the element address 31.

Moreover, the draw interrupt flag can be contained in the header of the window region set command 14 instead of the element draw commands 415. In such a case, the window region set command 14 containing a draw interrupt flag indicating a request for the central processing unit 406 to set an element address can be followed by element draw commands 315 not containing the element address 31. On the other hand, the window region set command 17 containing a draw interrupt command indicating no request for the central processing unit 406 to set an element address can be followed by element draw commands 315 containing the element address 31.

The central processing unit 406 comprises a ROM 435 and a controller 433 in place of the ROM 335 and controller 333 according to Modified Embodiment 2.

The RAM 34 is a volatile memory used as the work area of the controller 33 as described above. In other words, the RAM 34 retains various data and retains, for example, state data presenting the state of display data at a predetermined address as a state storage.

Here, the state of display data is the operation state of the remote controller 401 and, for example, the temperature value when the set temperature is displayed and the displayed time when the current time is displayed. The address within the RAM 34 where the display data are retained is defined, for example, by a display application 471.

When the ROM 435 is readable/writable, the display data can be retained in the ROM 435 as the state storage in place of the RAM 34.

The ROM 435 stores the display application 471 and an interrupt response table 472 as an interrupt response table storage in addition to the same control application 40 and screen management table 41 as in Embodiment 1.

The display application 471 includes a program executed by the controller 433 for setting an element address. This program can be included in the control application 40, a not-shown other application, or the like.

The interrupt response table 472 is, as shown in FIG. 19, a table associating, for each combination of draw command data and a draw interrupt count, a reference destination address and an element address corresponding to the content of the state data.

The draw interrupt count is the number of times of a draw interrupt signal being acquired. The draw interrupt signal is a signal output from the draw processing unit 407 to the central processing unit 406 when the draw interrupt flag is "1."

The reference destination address is a place in the storage region of the RAM 34 where the state data are retained and presents the reference destination for acquiring the state data corresponding to the combination of the draw command data and draw interrupt count.

The element address is data presenting a place within the storage unit 405 the draw processing unit 407 should make reference to for creating the rest of the draw command.

The interrupt response table shown in the same figure associates a "reference destination," "values," and "element addresses" for each combination of draw command data and a draw interrupt count. A reference destination address is stored in the "reference destination" and one "reference destination" is associated with multiple "values." A possible value of the state data retained at the associated reference destination address is stored in the "value," which corresponds to the content of the display data. An element address associated one-on-one with the "value" is stored in the "element address."

For example, under the "draw command address" of "AAAAA," a "reference destination" is associated with each draw interrupt count from one to N (N is an integer of 3 or higher). A "reference destination" of "Pa1" associated with a "draw interrupt count: 1," namely the first draw interrupt signal, is associated with two sets of "value" and "element address." A "reference destination" of "Pam" associated with a "draw interrupt count: M" (M is an integer of 2 or higher), namely the M-th draw interrupt signal, is associated with four sets of "value" and "element address."

Furthermore, under the "draw command address" of "BBBBB," a "reference destination," "values," and "element addresses" are associated with each draw interrupt count from one to M.

As described above, the number of "draw interrupt counts" combined with a "draw command address" can vary depending on the "draw command address." Furthermore, a set of "draw command address" and "draw interrupt count" is associated with one "reference destination." The number of sets of "value" and "element address" associated with a "reference destination" can vary depending on the "reference destination."

Moreover, the contents of the interrupt response table 472 can be incorporated into the display application 471.

When the central processing unit 406 receives a draw interrupt signal and detects the draw interrupt flag in the interrupt register 468 being "1," the central processing unit 406 makes reference to data retained, for example, in the RAM 34 and ROM 435 to create an element address. Then, the central processing unit 406 outputs to the draw processing unit 407 a host command for setting the extracted element address.

In detail, when the central processing unit 406 acquires a draw interrupt signal from the draw processing unit 407, the central processing unit 406 makes reference to the interrupt response table 472 retained in the ROM 435. Then, the central processing unit 406 identifies the reference destination address corresponding to the draw command address and draw interrupt count retained in the RAM 34. Furthermore, the central processing unit 406 extracts the element address corresponding to the content of the state data stored in the storage region of the RAM 34 at the identified reference destination address.

As described above, the central processing unit 406 determines the element address corresponding to the display screen in the process of drawing, the operation state of the remote controller (the content of the state data), and the draw interrupt signal acquisition count since the start of drawing the display screen. The central processing unit 406 outputs to the draw processing unit 407 a host command containing the extracted element address.

The draw processing unit 407 comprises a register 445 comprising an interrupt register 468, a host interface 446, and a command interpreter 448 in place of the register 45, host interface 346, and command interpreter 348 according to Modified Embodiment 2.

The interrupt register 468 is a register for setting a draw interrupt flag indicating transmission of a draw interrupt signal to the central processing unit 406 in addition to the same draw end flag as in Embodiment 1.

The host interface 446 inputs/outputs the same data as the host interface 346 according to Modified Embodiment 2. In addition, the host interface 446 monitors the interrupt register 468 and outputs an interrupt signal to the central processing unit 406, for example, when the drawing end flag or draw interrupt flag indicating "1" is set.

The command interpreter 448 interprets the draw command data 413 and sets a window region, element type, element region, and, if necessary, an element address in the corresponding registers 63, 65, 66, and 67, respectively.

The configuration of the remote controller 401 according to this embodiment is described above. The processing executed by the remote controller 401 will be described hereafter with reference to the drawings.

Figure 20A:
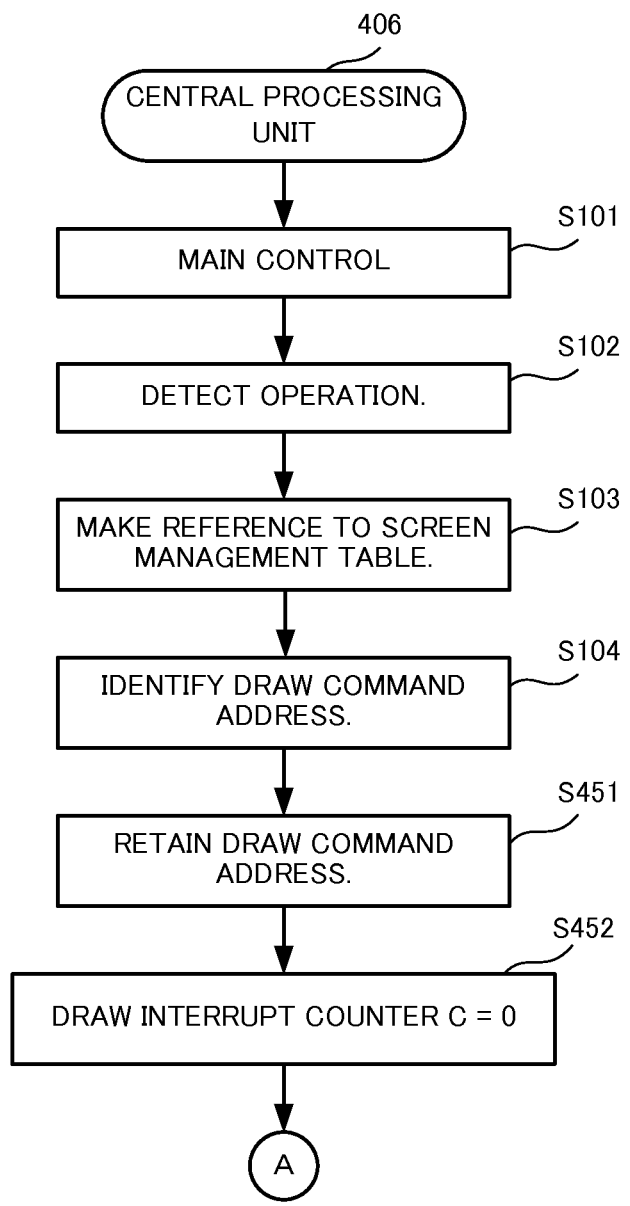
FIG. 20A is a chart showing an exemplary flow of the processing executed by the remote controller according to Embodiment 2.

As shown in FIG. 20A, after executing the processing of the Steps S101 to S104, the central processing unit 406 retains the draw command address identified in the Step S104 in the RAM 34 (Step S451).

The central processing unit 406 sets a draw interrupt counter C retained, for example, in the RAM 34 to zero (Step S452). Here, the draw interrupt counter is a counter for counting the number of times of a draw interrupt being acquired during execution of a draw command stored in the draw command address identified in the Step S104.

Figure 20B:
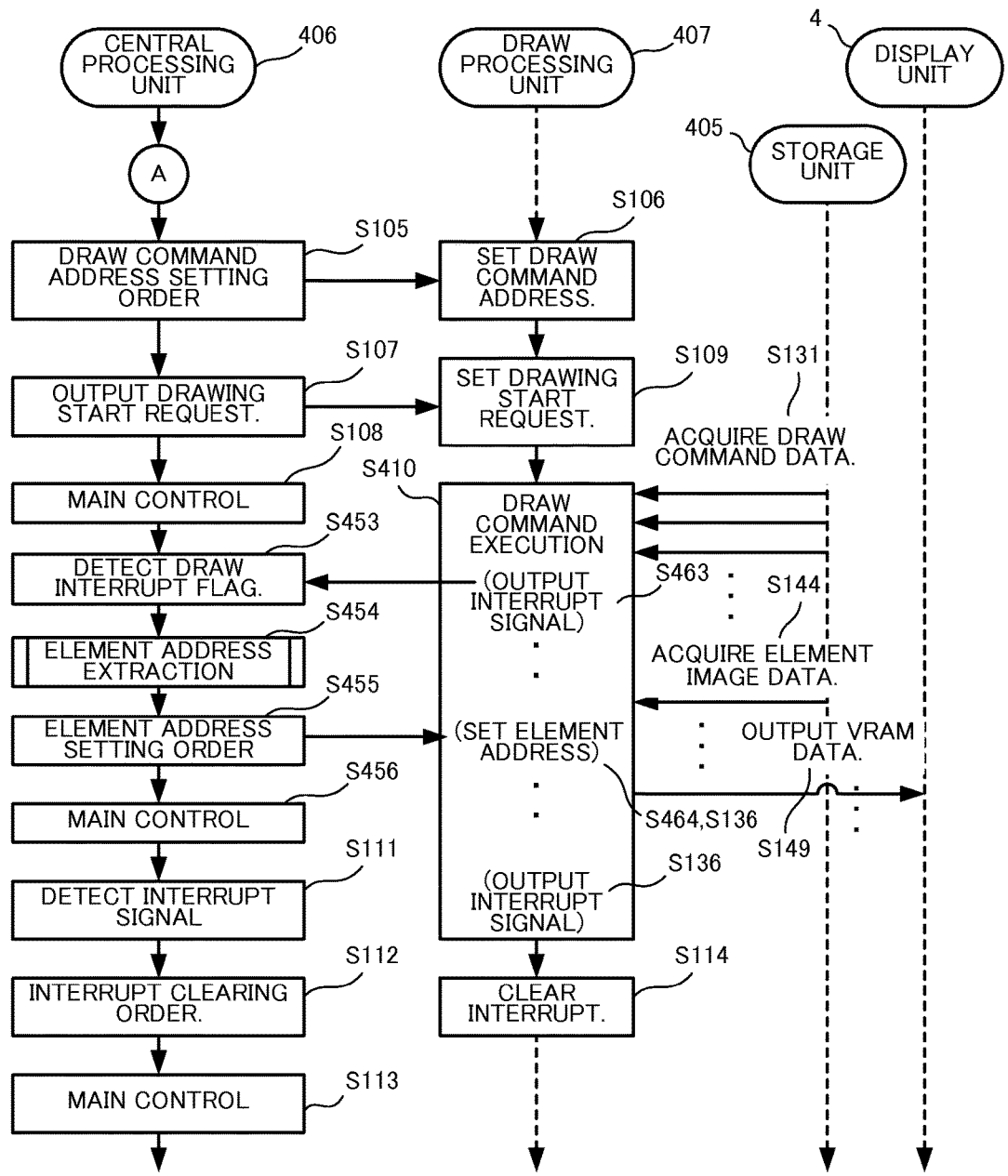
FIG. 20B is a chart showing an exemplary flow of the processing executed by the remote controller according to Embodiment 2.

Subsequently, as shown in FIG. 20B, the central processing unit 406 executes the processing of the Steps S105 to S108. The draw processing unit 407 executes the Steps S106 and 109 corresponding to the Steps S105 and S106, respectively.

The draw processing unit 407 sets a draw interrupt flag as necessary in the draw command execution procedure (Step S410) described in detail later, outputs a draw interrupt signal (Step S463), and pauses the draw command execution procedure.

As the central processing unit 406 detects an interrupt signal output from the draw processing unit 407 with the input port 37, the central processing unit 406 pauses the main control procedure and outputs a host command for acquiring the content of the interrupt register 468 from the draw processing unit 407. As a result, the central processing unit 406 detects the draw interrupt flag set in the interrupt register 468 (Step S453).

When the acquired draw interrupt flag in the interrupt register 468 is "1," the central processing unit 406 makes reference to the draw command identification data corresponding to the display screen in the process of drawing retained in the RAM 34 and the interrupt response table 472. As a result, the central processing unit 406 extracts as described in detail later the element address corresponding to the display screen in the process of drawing, the operation state of the remote controller 401, and the draw interrupt occurrence count since the start of drawing the display screen (Step S454). If the acquired draw interrupt flag in the interrupt register 468 is not "1," the central processing unit 406 can resume the main control procedure.

The central processing unit 406 outputs a host command for setting the determined element address and a host command for clearing the draw interrupt flag to the draw processing unit 407 via the communicator 336 (Step S455). Subsequently, the central processing unit 406 resumes the main control procedure (Step S456).

Moreover, the central processing unit 406 can output a host command for setting all registers along with the host command for setting an element address.

As the host interface 446 of the draw processing unit 407 acquires the host command for setting an element address, the draw processing unit 407 sets the element address in the draw command execution procedure (Step S410) (Step S464 or S136).

Figure 21:
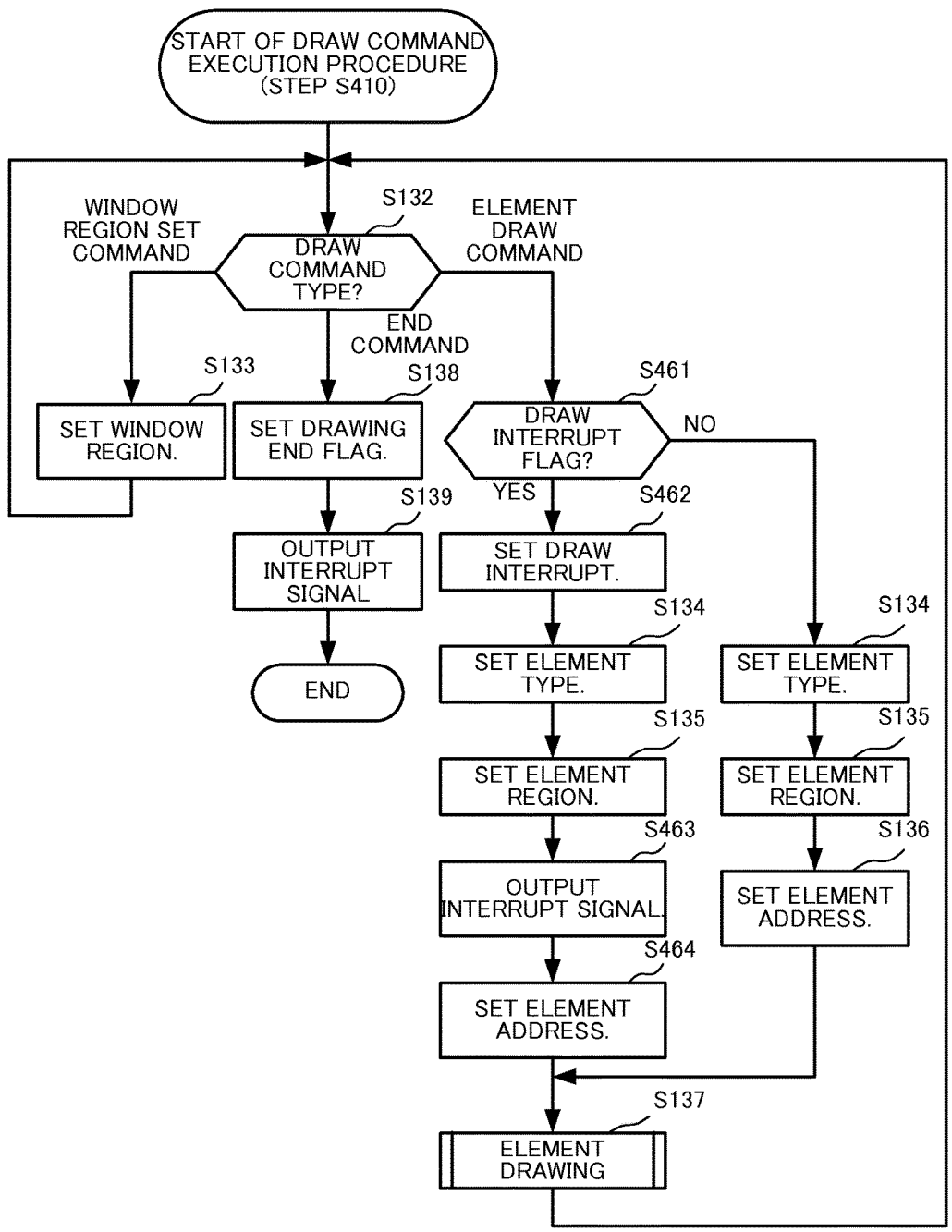
FIG. 21 is a flowchart showing the details of the draw command execution procedure shown in FIG. 20.

The draw command execution procedure (Step S410) will be described in detail with reference to FIG. 21.

If the draw command type is an element draw command 415 in the Step S132, the command interpreter 448 determines whether there is a draw interrupt flag contained in the header 425 (Step S461).

If no draw interrupt flag is contained ("0" in this embodiment) (Step S461; NO), the command interpreter 448 sets the element type, element region, and element address in sequence as in Embodiment 1 (Steps S134 to S136).

If a draw interrupt flag is contained ("1" in this embodiment) (Step S461; YES), the command interpreter 448 sets the draw interrupt flag in the interrupt register 468 (Step S462). The command interpreter 448 sets the element type and element region in the element type register 65 and element region register 66, respectively (Steps S134 and S135).

Detecting a draw interrupt being set in the interrupt register 468, the host interface 446 outputs a draw interrupt signal to the central processing unit 406 (Step S463). Then, the draw processing unit 407 pauses the draw command execution procedure (Step S410).

Acquiring a host command for setting an element address from the central processing unit 406, the host interface 446 resumes the draw command execution procedure (Step S410) and stores the element address contained in the acquired command in the element address register 67 (Step S464).

After setting the element address (Step S464 or S136), the drawer 49 executes the element drawing procedure (Step S137). The command interpreter 348 having received an element drawing end notice from the drawer 49 returns to the Step S132.

Figure 22:
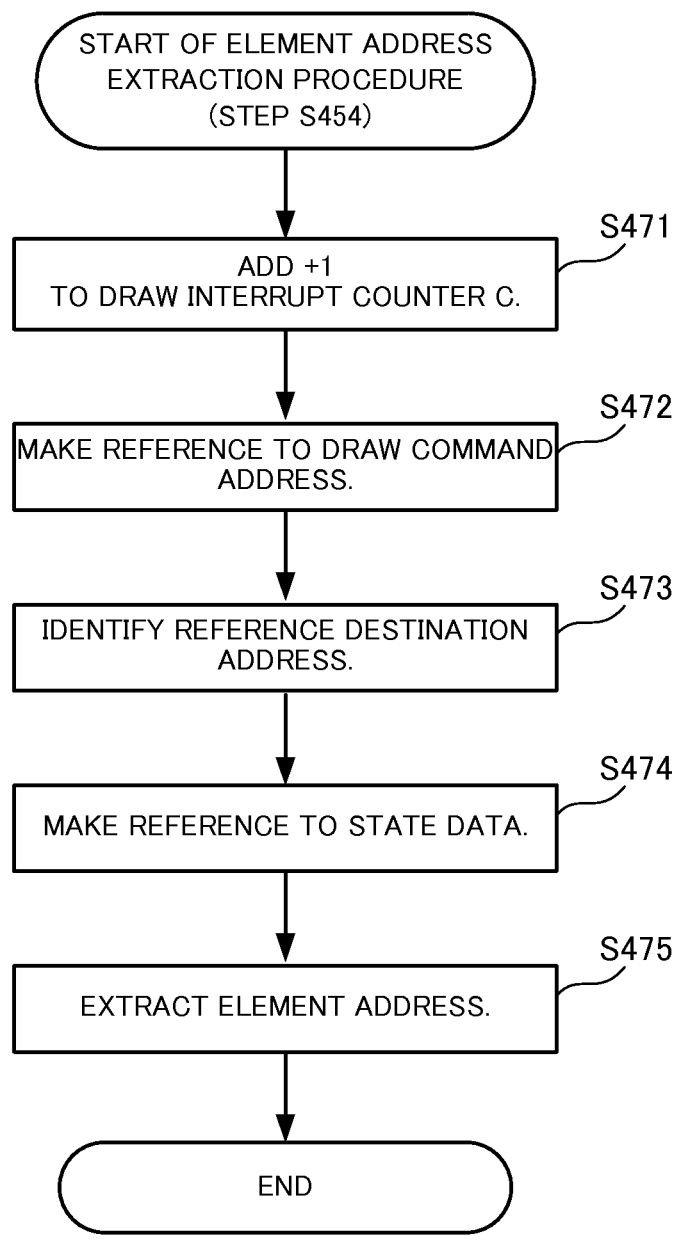
FIG. 22 is a flowchart showing the details of the element address extraction procedure shown in FIG. 20.

Details of the element address extraction procedure (Step S410) will be described with reference to FIG. 22.

The central processing unit 406 increases the draw interrupt counter C in the RAM 34 by +1 (Step S471) and makes reference to the draw command address retrained in the Step S451 (Step S472).

The central processing unit 406 identifies the reference destination address associated with the combination of the value of the draw interrupt counter C after increased in the Step S471 (the draw interrupt count) and the draw command address referred to in the Step S472 (Step S473).

For example, it is assumed that the value of the draw interrupt counter C after increased in the Step S471 is "1" and the draw command address referred to in the Step S472 is "AAAAA." In such a case, with reference to the interrupt response table 472 shown in FIG. 19, a reference destination address "Pa1" is associated with the combination of the draw interrupt count "1" and draw command address "AAAAA." Therefore, in this case, the central processing unit 406 identifies the reference destination address "Pa1" in the Step S473.

The central processing unit 406 makes reference to the state data retained in the storage region of the RAM 34 at the reference destination address identified in the Step S473 (Step S474). The central processing unit 406 extracts the element address corresponding to the referred state data from the interrupt response table 472 (Step S475).

For example, the central processing unit 406 makes reference to the state data retained in the storage region of the RAM 34 at the address "Pa1" identified in the above case in the Step S474. It is assumed that the content of the referred state data is "i_a1." The central processing unit 406 extracts the element address "XXXX1Pi" associated with the value "i_a1" in the interrupt response table 472 in the Step S475.

Then, the central processing unit 406 ends the element address extraction procedure (Step S454).

Executing the above-described element address extraction procedure (Step S454), the central processing unit 406 can determine the element address corresponding to the display screen in the process of drawing, the content of the state data, and the draw interrupt signal acquisition count since the start of drawing the display screen.

The case in which only the screen contents of a display image displayed under the same drawing condition are changed in this embodiment will be described hereafter using an example of FIG. 23. In the example shown in the figure, the humidity display displayed on the remote controller 401 of an air conditioner is changed from character-based display to icon-based display.

First, as an image of digits is changed to an icon image, the volume of the element image data 12 is generally increased as in the case described with reference to FIG. 10. Therefore, the storing locations of the element image data 12 stored following those element image data 12 are changed. If the change of the storing location of the element image data 12 presenting the humidity affects the storing location of the element image data 12 presenting, for example, the operation mode, the element address 31 contained in the draw command data 13 has to be changed. Furthermore, the size and display position of the element image presenting the humidity are changed, whereby the relative coordinate values 27 to 30 ("RX0, RX1, RY0, RY1" in FIG. 18) of the element draw command 415 are changed.

Furthermore, there is no longer need of displaying "%" for humidity display. In this example, the number of element draw commands 415 contained in the draw command data 413 changes. In the example of FIG. 23, the number of element draw commands 415 is decreased. Therefore, it is possible to space the draw command data 413 stored next to each other so as not to change the storing addresses of the draw command data 413.

Figure 23:
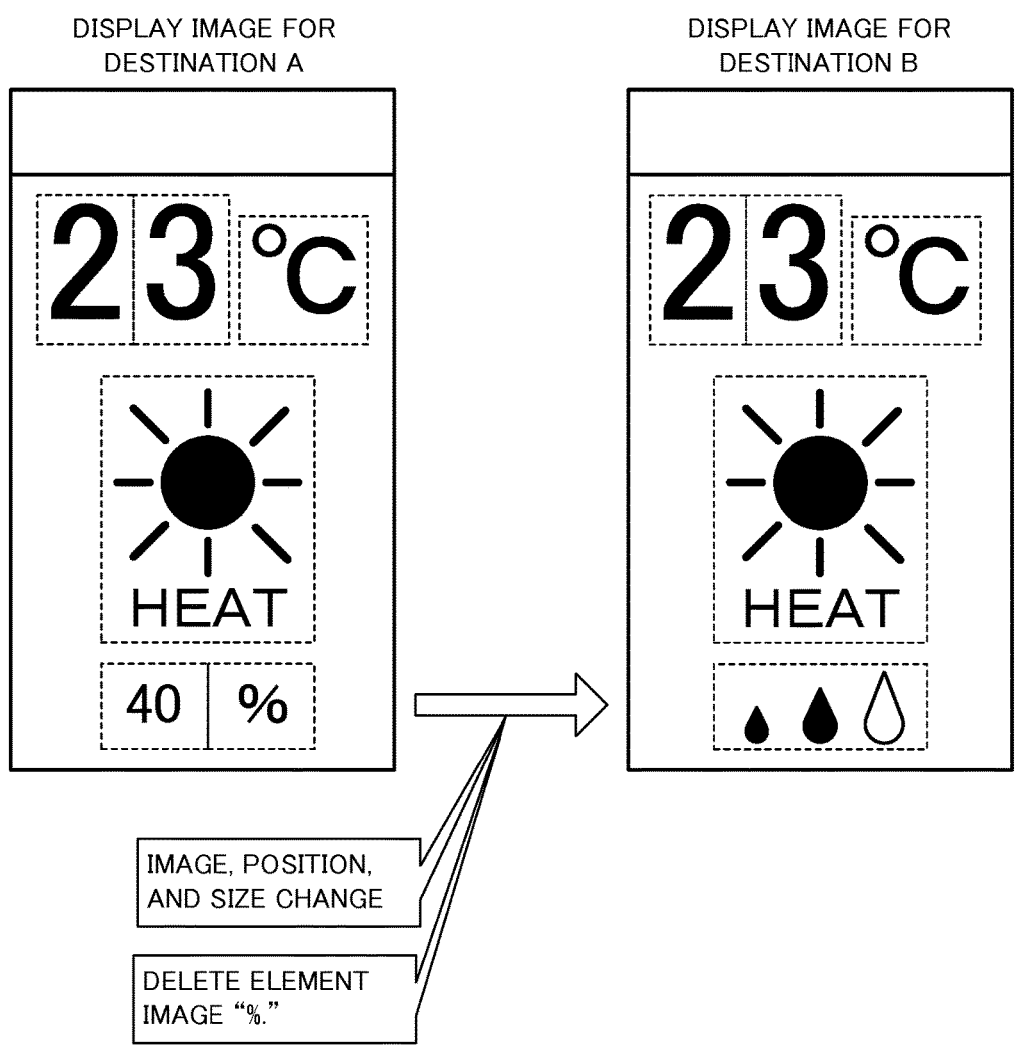
FIG. 23 is an illustration showing another exemplary case in which the screen contents of a display image displayed under the same drawing condition are changed depending on the destination.

As described above, along with the change of a screen content shown in FIG. 23, the contents of the element image data 12 stored in the storage unit 405, the location (address) where the element image data 12 are stored, the relative coordinate values 27 to 30 contained in the draw command data 413, and the element address 31 contained in the draw command data 413 change. At this point, the draw command data 13 are changed only in values contained therein; the data size thereof does not change. Therefore, the draw command identification data output by the central processing unit 6 are the same before and after the screen content is changed.

Furthermore, in the example shown in the same figure, when four element images, an element image presenting the operation mode, the tens digit of the temperature, the ones digit of the temperature, and the humidity, are drawn by a draw interrupt, the number of interrupt flags in the draw command data 413 is unchanged before and after the screen contents are changed. Therefore, the processing executed by the central processing unit 406 to create and output the rest of the draw command is unchanged.

Embodiment 2 of the present disclosure is described above.

This embodiment particularly yields the following efficacy in addition to the same efficacy as Embodiment 1.

Display images displayed on the remote controller 401 are designed differently depending on the national culture such as which is preferred, icons or character display. However, information presented by a display image displayed under the same drawing condition such as a display image displayed in heating/air conditioning operation is generally the same regardless of the national culture. Therefore, the essential function of a display image on the remote controller 401 can be maintained by limiting the mutually influenced portions of the central processing unit 406 and draw processing unit 407 to the minimum information necessary for operating an air conditioner or the like. Thus, if the design is changed to the extent that the essential function of a display image is maintained, the control application 40 executed by the central processing unit 406 does not need to be altered.

Therefore, when only the screen design is changed as necessary after the major development is completed or for each shipping destination, the screen design can be changed without accessing the storage region of the ROM 435 or the like of the central processing unit 406 retaining the control application 40. Consequently, the risk of failure such as data writing errors and mismatched versions can be prevented.

This embodiment can be modified as follows.

Modified Embodiment 3

For example, the central processing unit 406 of this embodiment determines the element address and outputs an element address setting order after detecting a draw interrupt flag in the Step S451. However, the central processing unit 406 can execute a procedure to create an element address corresponding to the draw interrupt occurrence count since the start of drawing a display screen immediately after outputting a drawing start request. Then, the central processing unit 406 can store an element address setting order, for example, in a given buffer of its own.

In such a case, the element address setting order is created in sequence so as to be stored in the buffer in the ascending order of draw interrupt occurrence count, and output from the buffer as soon as an interrupt signal from the draw processing unit 407 is detected. Moreover, using a hardware function of data output from a given memory region (DMA, direct memory access), the output from the buffer can be done with no processing load of the CPU.

In this modified embodiment, while the draw processing unit 407 processes the element draw command 415b not requiring a draw interrupt signal, the central processing unit 406 can prepare an element address setting order in parallel. Therefore, the time from output of an interrupt signal to setting of an element address can be shortened, whereby high speed drawing is available.

Modified Embodiment 4

Figure 24:
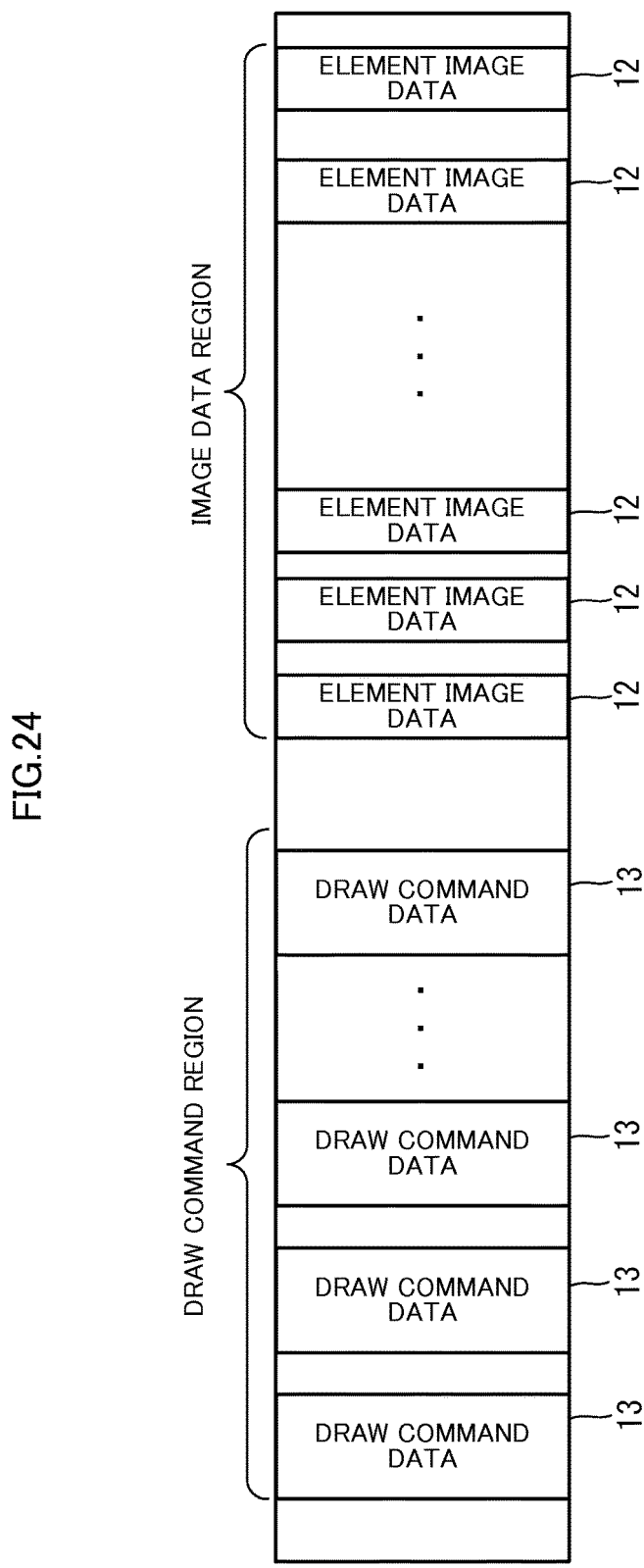
FIG. 24 is an illustration showing exemplary data placement within the storage unit according to Modified Embodiments 4 and 5.

The draw command data 413 can be stored in the draw command region with preliminarily given spaces in-between as shown in FIG. 24. As a result, although a larger memory capacity is required, there will be no need of changing the storing addresses of the draw command data 413 even if the number of element draw commands 415 is increased.

Modified Embodiment 5

The element image data 12 can be stored in the image data region with spaces in-between as shown in FIG. 24. In this modified embodiment, even if the data size of the element image data 12 is increased as some screen contents are change, there will be no need of changing the element addresses as long as the data size change falls within the space range between the element image data 12. Therefore, alteration of the draw command data 413 or display application 471 can be reduced.

Modified Embodiment 6

Figure 25:
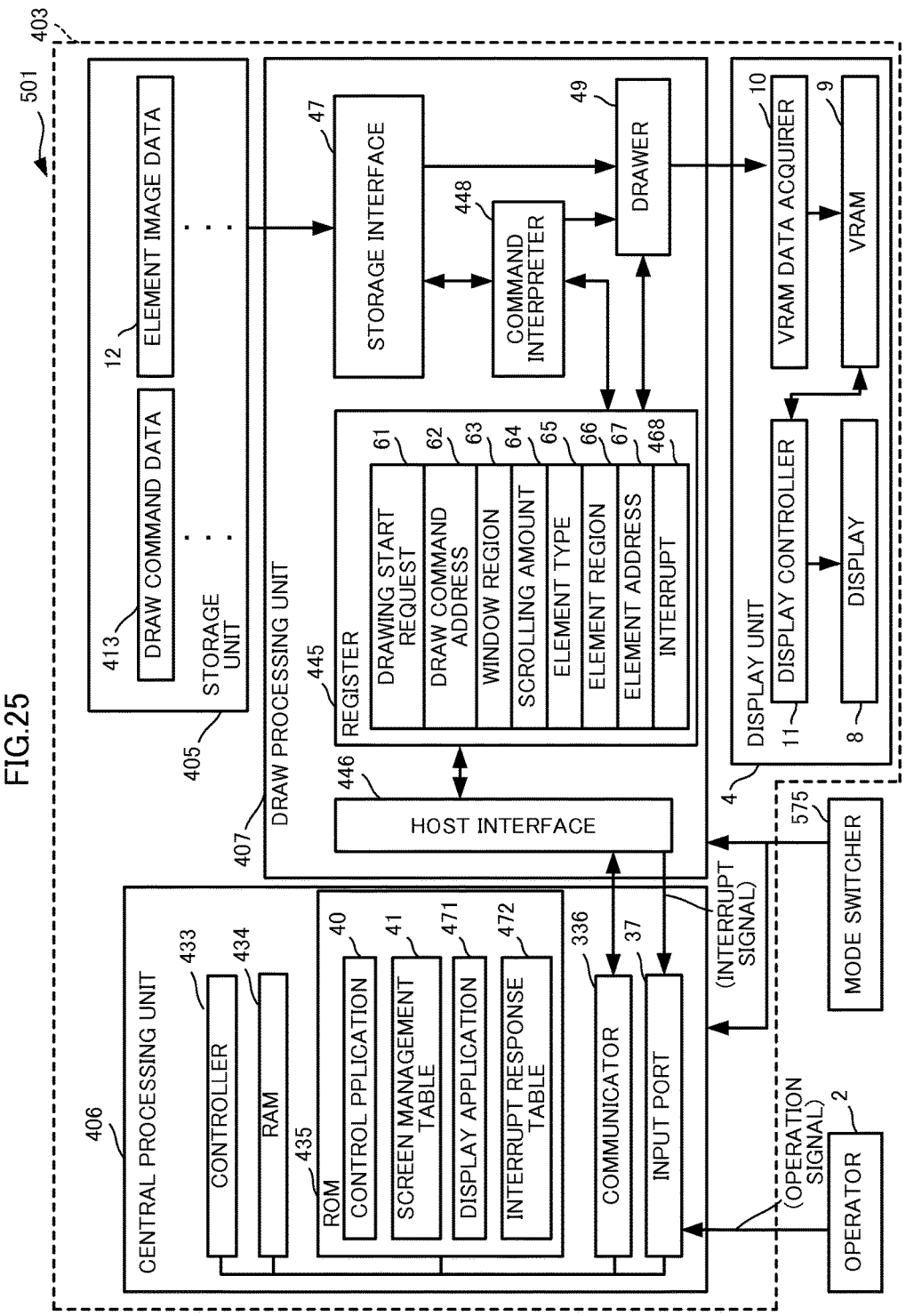
FIG. 25 is a diagram showing the configuration of the remote controller according to Modified Embodiment 6.

A remote controller 501 according to this modified embodiment comprises, as shown in FIG. 25, a mode switcher 575 in addition to the configuration of the remote controller 401 according to Embodiment 2. The mode switcher 575 is a switch for switching the operation mode of the central processing unit 406 and draw processing unit 407 between a normal mode and an update mode. The mode switcher 575 is realized, for example, by a DIP (dual in-line package) switch.

The normal mode is the operation mode in which the remote controller 501 executes the operation described in Embodiment 2. The update mode is the operation mode to update the data 413 and 12 stored in the storage unit 405.

The operation of the remote controller 501 in the update mode will be described.

In the update mode, the data 413 and 12 to update are entered into the central processing unit 406 along with the address data presenting the storing locations of the data 413 and 12 within the storage unit 405. The input data can be entered, for example, from an external IT (interface) (not shown) of the central processing unit 406.

The input data to the central processing unit 406 simply pass through the central processing unit 406 and draw processing unit 407 and the storage unit 405 stores the input data at the addresses presented by the address data. In other words, in the update mode, the central processing unit 406 and draw processing unit 407 simply transfer the input data to the storage unit 405 in sequence.

In this modified embodiment, the remote controller 501 operates in the update mode, whereby the data 413 and 12 stored in the storage unit 405 can be updated without changing the hardware configuration of the remote controller 501 from that in the normal mode operation. Furthermore, the data 413 and 12 stored in the storage unit 405 can be updated without changing the control application 40 and display application 471 retained in the central processing unit 406.

Some embodiments and modified embodiments of the present disclosure are described above. The present disclosure is not confined to the embodiments and modified embodiments and includes, for example, any combination of the embodiments and modified embodiments and the technical scope equivalent thereto.

REFERENCE SIGNS LIST

1, 301, 401, 501 Remote controller
2 Operator
3, 303 Control device
4 Display unit
5, 305, 405 Storage unit
6, 306, 406 Central processing unit
7, 307, 407 Draw processing unit
8 Display
9 VRAM
10 VRAM data acquirer
11 Display controller
33, 333, 433 Controller
34 RAM
35, 335, 435 ROM
36, 336 Communicator
37 Input port
45 Register
46, 346, 446 Host interface
47 Storage interface
48, 348, 448 Command interpreter
49 Drawer
61 Drawing start request register
62 Draw command address register
63 Window region register
64 Scrolling amount register
65 Element type register
66 Element region register
67 Element address register
68, 468 Interrupt register
575 Mode switcher

The invention claimed is:

1. A control device, comprising:
a storage unit configured to:
prestore element image data presenting an element image contained in a display image that is an image to be displayed on a display unit in an image data region, and
prestore draw command data containing data for creating display data presenting the display image in which the element image is placed in a draw command region;
a central processing unit configured to:
identify a draw command identification data associated with a drawing condition data presenting a predetermined drawing condition, and
output the identified draw command identification data; and
a draw processing circuit configured to:
acquire from the storage unit the draw command data presented by the draw command identification data output from the central processing unit,
create the display data based on the acquired draw command data, and
output the created display data to the display unit,
wherein:
the draw command data contains part of the data for creating the display data and a draw interrupt flag indicating that the rest of the data for creating the display data is acquired from the central processing unit, and
the draw processing circuit comprises:
an interface configured to:
acquire the output draw command identification data when the draw command identification data are output from the central processing unit,
output to the central processing unit a draw interrupt signal for requesting for the rest of the data for creating the display data, and
acquire from the central processing unit the rest of the data for creating the display data;
an interpreter configured to:
acquire from the storage unit the draw command data presented by the draw command identification data acquired by the interface,
interpret the acquired draw command data to extract part of the data for creating the display data, and
causes the interface to output the draw interrupt signal according to the draw interrupt flag; and
a drawer configured to:
create the display data presenting an image in which the element image is placed based on the part of the data for creating the display data extracted by the interpreter and the rest of the data for creating the display data acquired by the interpreter, and
output the created display data to the display unit.

2. The control device according to claim 1, wherein the central processing unit comprises:
a state storage configured to retain state data presenting the state of display data at a predetermined address; and
an interrupt response table storage configured to store an interrupt response table associating, for each combination of the draw command identification data and a draw interrupt count that is the number of times of the draw interrupt signal being acquired, a reference destination address for acquiring the state data from the state storage and the rest of the data for creating the display data corresponding to the content of the state data, and
when the draw interrupt signal is acquired from the draw processing circuit, the central processing unit:
makes reference to the interrupt response table to identify the reference destination address corresponding to the draw command identification data and draw interrupt count,
extracts the rest of the data for creating the display data corresponding to the content of the state data stored at the identified reference destination address, and
outputs the extracted rest of the data for creating the display data to the draw processing circuit.

3. The control device according to claim 2, wherein the central processing unit:
comprises a buffer configured to store the rest of the data for creating the display data;
after outputting the draw command identification data, makes reference to the interrupt response table corresponding to the draw command identification data, and stores in the buffer the data presenting the address in sequence in the ascending order of associated interrupt signal acquisition count as the rest of the data for creating the display data; and when the draw interrupt signal is acquired from the draw processing circuit, the central processing unit outputs the data stored in the buffer to the draw processing circuit in sequence.

4. The control device according to claim 1, wherein the draw command region is a continuous storage region.

5. The control device according to claim 1, wherein the image data region is a continuous storage region.

6. The control device according to claim 1, wherein the central processing unit:

prestores a screen management table associating the drawing condition data and the draw command identification data, and when the drawing condition is satisfied identifies the draw command identification data associated with the drawing condition data presenting the satisfied drawing condition based on the screen management table.

7. The control device according to claim 1, wherein:

a mode switcher configured to switch between a normal mode in which the central processing unit and draw processing circuit execute a procedure to output the display data and an update mode for updating data stored in the storage unit is provided, the central processing unit outputs to the draw processing circuit input data entered along with address data presenting the addresses to store in the storage unit as they are during the update mode, the draw processing circuit outputs to the storage unit the address data and input data entered from the central processing unit as they are during the update mode, and the storage unit stores the input data entered from the draw processing circuit at the addresses contained in the address data.

8. The control device according to claim 1, wherein the draw command identification data presents an address within the storage unit where the draw command data are stored, and the draw processing circuit acquires from the storage unit the draw command data stored at the address presented by the draw command identification data output from the central processing unit.

9. The control device according to claim 8, wherein:

the draw command data contains element identification data presenting the address where the element image data are stored and element placement data for identifying the display position of the element image;

the interpreter is further configured to interpret the acquired draw command data to extract the element identification data and element placement data; and the drawer is further configured to:

acquire from the storage unit the element image data stored at the address presented by the element identification data extracted by the interpreter, and prior to outputting the created display data to the display unit, create the display data presenting an image in which the element image presented by the acquired element image data is placed based on the element placement data extracted by the interpreter.

10. A control device, comprising:

a storage unit configured to:

prestore element image data presenting an element image contained in a display image that is an image to be displayed on a display unit in an image data region, and prestore draw command data containing data for creating display data presenting the display image in which the element image is placed in a draw command region;

a central processing unit configured to:

identify a draw command identification data associated with a drawing condition data presenting a predetermined drawing condition, and output the identified draw command identification data; and a draw processing circuit configured to:

acquire from the storage unit the draw command data presented by the draw command identification data output from the central processing unit, create the display data based on the acquired draw command data, and output the created display data to the display unit, wherein the element image data are stored in the image data region with spaces in-between.

11. A control device, comprising:

a storage unit configured to:

prestore element image data presenting an element image contained in a display image that is an image to be displayed on a display unit in an image data region, and prestore draw command data containing data for creating display data presenting the display image in which the element image is placed in a draw command region;

a central processing unit configured to:

identify a draw command identification data associated with a drawing condition data presenting a predetermined drawing condition, and output the identified draw command identification data; and a draw processing circuit configured to:

acquire from the storage unit the draw command data presented by the draw command identification data output from the central processing unit, create the display data based on the acquired draw command data, and output the created display data to the display unit, wherein the draw command data are stored in the draw command region with spaces in-between.

* * * * *